| (12) | United States Patent | (10) Patent No.: | US 9,188,062 B2 |
|---|---|---|---|
| | Tsutsumi et al. | (45) Date of Patent: | Nov. 17, 2015 |

(54) GAS TURBINE

(71) Applicant: MITSUBISHI HEAVY INDUSTRIES, LTD., Tokyo (JP)

(72) Inventors: Eiichi Tsutsumi, Tokyo (JP); Kenichi Arase, Tokyo (JP); Hitoshi Morimoto, Tokyo (JP); Taichi Ozaki, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 636 days.

(21) Appl. No.: 13/727,363

(22) Filed: Dec. 26, 2012

(65) Prior Publication Data

US 2015/0226124 A1 Aug. 13, 2015

(30) Foreign Application Priority Data

Aug. 30, 2012 (JP) ................................. 2012-190008

(51) Int. Cl.
*F01D 11/18* (2006.01)
*F02C 7/20* (2006.01)
*F01D 11/00* (2006.01)
*F02C 7/28* (2006.01)
(Continued)

(52) U.S. Cl.
CPC ................ *F02C 7/20* (2013.01); *F01D 11/003* (2013.01); *F02C 3/04* (2013.01); *F02C 7/28* (2013.01); *F01D 1/02* (2013.01); *F01D 25/24* (2013.01); *F01D 25/28* (2013.01); *F05D 2240/55* (2013.01); *F05D 2240/581* (2013.01)

(58) Field of Classification Search
CPC ......... F01D 1/02; F01D 11/003; F01D 25/28; F01D 25/24; F01D 2240/55; F01D 2240/581

USPC ..................... 415/170.1, 173.1, 229
See application file for complete search history.

(56) References Cited

U.S. PATENT DOCUMENTS 3,892,497 A 7/1975 Gunderlock et al.
5,238,365 A 8/1993 Petsche
(Continued)

FOREIGN PATENT DOCUMENTS

CN 1453452 A 11/2003
CN 1648417 A 8/2005
(Continued)

OTHER PUBLICATIONS

International Search Report mailed Mar. 19, 2013, issued in corresponding EP Patent Application No. PCT/JP2012/083983 with English partial translation (4 pages).
(Continued)

*Primary Examiner* — Ching Chang
(74) *Attorney, Agent, or Firm* — Westerman, Hattori, Daniels & Adrian, LLP

(57) ABSTRACT

In a gas turbine of the invention, a first blade ring portion to which first vanes are attached and a second blade ring portion to which second vanes are attached are integrally formed to form an integrated blade ring. A second upstream pressing member is arranged on the upstream side of a second upstream isolation ring which attaches a first ring segment and a second vane stage which is arranged on the downstream side of the first ring segment to the integrated blade ring. By attaching the pressing member to the blade ring portion, the pressing member pushes and fixes the isolation ring to the downstream side, and the sealing performance of a packing is maintained.

17 Claims, 17 Drawing Sheets

(51) Int. Cl.
*F02C 3/04* (2006.01)
*F01D 1/02* (2006.01)
*F01D 25/24* (2006.01)
*F01D 25/28* (2006.01)

(56) References Cited

U.S. PATENT DOCUMENTS

| | | | |
|---|---|---|---|
| 8,602,724 B2 * | 12/2013 | Takahashi et al. | ............ 415/145 |
| 2011/0275003 A1 | 11/2011 | Udatsu et al. | |

FOREIGN PATENT DOCUMENTS

| CN | 101220756 A | 7/2008 |
|---|---|---|
| JP | 50-155819 A | 12/1975 |
| JP | 2004-150325 A | 5/2004 |
| JP | 3863938 B2 | 12/2006 |
| JP | 2008-151007 A | 7/2008 |
| JP | 2009-185779 A | 8/2009 |
| WO | 2010/084753 A1 | 7/2010 |

OTHER PUBLICATIONS

Written Opinion mailed Mar. 19, 2013, issued in corresponding EP Patent Application No. PCT/JP2012/083983 with English translation (8 pages).

International Search Report mailed Mar. 19, 2013, issued in corresponding PCT Patent Application No. PCT/JP2012/083983 with English partial translation (4 pages).

Written Opinion mailed Mar. 19, 2013, issued in corresponding PCT Patent Application No. PCT/JP2012/083983 with English translation (8 pages).

Office Action dated Aug. 6, 2015, issued in counterpart Chinese Patent Application No. 201280074932.X, with partial English translation (7 pages).

* cited by examiner

UPSTREAM      DOWNSTREAM

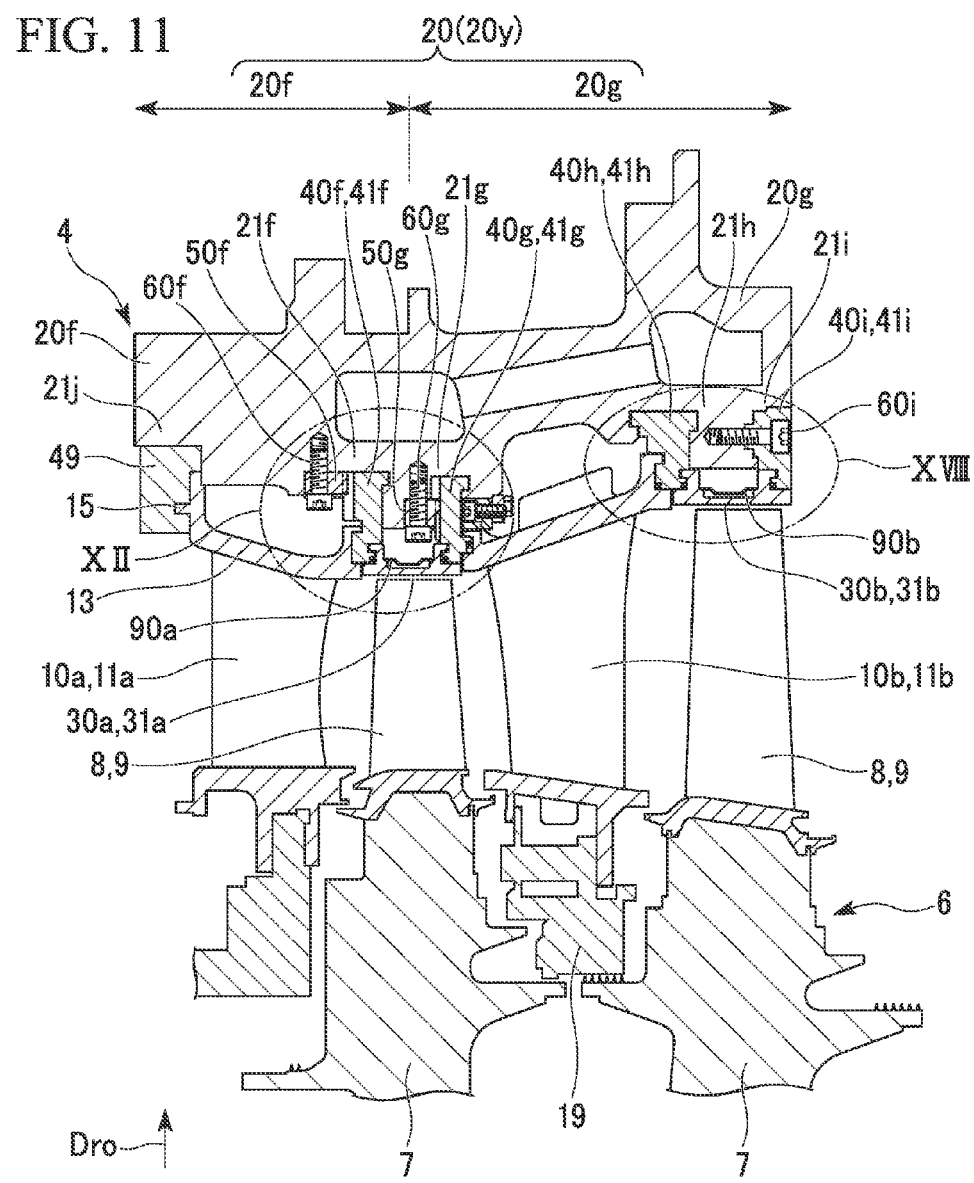
FIG. 11
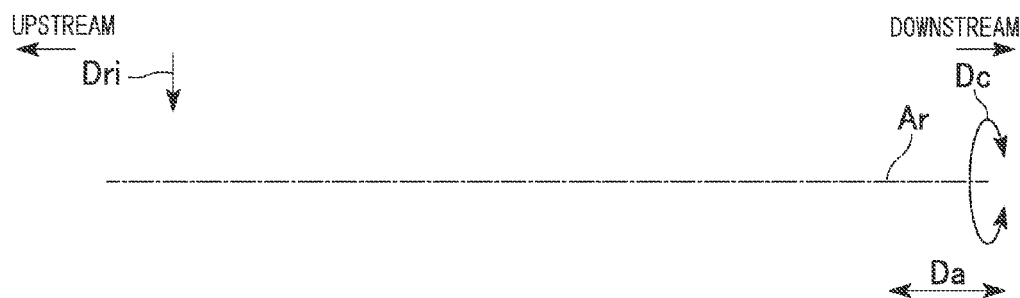

GAS TURBINE

TECHNICAL FIELD

The present invention relates to a gas turbine equipped with a rotor and a casing that covers this rotor, and particularly, to the structure of the casing of the gas turbine.

Priority is claimed on Japanese Patent Application No. 2012-190008, filed Aug. 30, 2012, the content of which is incorporated herein by reference.

BACKGROUND ART

Gas turbines are equipped with a rotor body that rotates around a rotation axis, a rotor that has a plurality of blade stages that are lined up in an axial direction and fixed to the rotor body, a plurality of vane stages each of which is arranged on the upstream side of each of the plurality of blade stages, and a casing that covers the rotor and has the plurality of vane stages attached to the inner peripheral side thereof.

The structure of a casing of a gas turbine is described in the following Patent Document 1. This casing is equipped with a plurality of blade rings that form an annular shape around a rotation axis. Each blade ring covers one blade stage and a vane stage arranged on the upstream side of this blade stage. This casing further forms an annular shape around the rotation axis. Additionally, the casing is equipped with a plurality of ring segments arranged between a plurality of vane stages on the inner peripheral side of the blade rings and on the outer peripheral side of blades, and isolation rings that form an annular shape around the rotation axis and attach vanes and the ring segments to the inner peripheral side of the blade rings.

A downstream portion in an outer shroud of each of a plurality of vanes that constitute a first vane stage is attached to a blade ring for a first stage via a first isolation ring arranged on the downstream side thereof. Additionally, the ring segment arranged on the downstream side of the first vane stage has an upstream portion attached to the blade ring for a first stage via the first isolation ring and a downstream portion attached to a second isolation ring. A fixing ring as a pressing member that presses this second isolation ring to the upstream side is arranged on the downstream side of the second isolation ring. This fixing ring is fixed to a downstream end of the blade ring for a first stage with a bolt.

Elastic metal packings that are elastically deformed in the axial direction and perform sealing between both are provided between the downstream portion in the outer shroud of each of the plurality of vanes that constitute the first vane stage, and the first isolation ring, between the first isolation ring and the ring segment, and between the ring segment and the second isolation ring.

PRIOR ART DOCUMENT

Patent Document

[Patent Document 1] Japanese Unexamined Patent Application, First Publication No. 2008-151007

SUMMARY OF THE INVENTION

Problem to be Solved by the Invention

In recent years, a method of integrating the first vane stage and the second vane stage of the gas turbine, and controlling the clearance between the integrated blade ring and blades to further improve the performance of the gas turbine has been adopted.

In the casing of the gas turbine described in the above Patent Document 1, parts are sequentially attached from upstream parts to downstream parts, and finally, the fixing ring furthest away on the downstream side is moved to the upstream side and fixed with bolts whereby the respective parts are pressed to the upstream side and fixed while compressing an elastic metal packing between the respective parts.

However, if the blade ring for a first stage and the blade ring for a second stage are made integral when attaching the isolation ring (for example, an isolation ring located at a boundary between a first ring segment which is located between a first vane and a second vane, and the second vane) to be arranged in the vicinity of the center of the integrated blade ring in the axial direction, it is difficult to install this isolation ring in the axial direction or the circumferential direction to fix this isolation ring to the blade ring while compressing an elastic metal packing between the respective parts.

That is, in the related art, if the blade ring for a first stage and the blade ring for a second stage are made integral, there is a problem in that it is difficult to install the isolation rings, the ring segments, the vanes, or the like in the axial direction or the circumferential direction while compressing an elastic metal packing between the respective parts, and assembly of the casing is difficult.

Thus, an object of the invention is to provide a gas turbine that can secure the assemblability of a casing having an elastic metal packing between the respective parts in which a plurality of blade ring portions are integrated.

Means for Solving the Problems

The gas turbine related to the invention for solving the above problems is a gas turbine including a rotor having a rotor body that rotates around a rotation axis, and a plurality of blade stages that are lined up in an axial direction in which the rotation axis extends and that are fixed to the rotor body; a plurality of vane stages each of which is arranged on the upstream side of each of the plurality of blade stages; and a casing that covers the rotor and to which the plurality of vane stages are attached to the inner peripheral side thereof. The casing includes a plurality of blade ring portions that form an annular shape around the rotation axis and each cover one blade stage and one vane stage; a plurality of ring segments that form an annular shape around the rotation axis and are arranged between the plurality of vane stages on the inner peripheral side of the blade ring portions and on the outer peripheral side of the blade stages; and a plurality of isolation rings for attaching the ring segments arranged on the upstream side or the downstream side of the vane stages. Two or more of the blade ring portions that are adjacent to each other in the axial direction form an integrated blade ring that is integrally formed, an upstream member among the ring segments and the vane stages, which is arranged on the upstream side of a predetermined isolation ring among the plurality of isolation rings, is provided with the predetermined isolation ring, and a downstream member among the ring segments and the vane stages, which is arranged on the downstream side of the predetermined isolation ring, is provided with the predetermined isolation ring, and the casing tardier includes a pressing member winch is arranged on the upstream side of the predetermined isolation ring, which is attached to the blade ring portion, and which pushes a pressed member of at least one of the predetermined isolation ring and the upstream member to the downstream side.

According to the gas turbine concerned, even if the plurality of blade ring portions are integrally formed to form the integrated blade ring, the predetermined isolation ring, and the upstream member or the downstream member are pushed in the axial direction, and the sealing performance of the packing is maintained. Additionally, it becomes easy to install the predetermined isolation ring and the upstream member or the downstream member to the blade ring portion in the axial direction or the circumferential direction, and assembly of the overall casing becomes easy.

The casing may Include a structure in which the pressing member, the predetermined isolation ring, and a downstream wall of the blade ring portion, which extends further toward the radially inward side than the outer peripheral surface of the predetermined isolation ring, are arranged in this order from the upstream side toward the downstream side in the axial direction, and may include a structure in which the predetermined isolation ring is sandwiched by the pressing member and the downstream wall in the axial direction.

In this case, since the predetermined isolation ring is sandwiched by the pressing member and the downstream wad from the upstream side in the axial direction, the predetermined isolation ring is pushed to the downstream side in the axial direction by the pressing member and the predetermined isolation ring is pressed against the blade ring portion, the packing inserted between the predetermined isolation ring and the upstream member or the downstream member can be compressed. Additionally, since the position of the predetermined isolation ring in the axial direction is fixed, stable operation of the gas turbine is possible.

The blade ring portion may include an upstream wall that extends further toward the radially inward side than the outer peripheral surface of the predetermined isolation ring adjacent to the axial upstream side of the predetermined isolation ring, and the upstream wall may be provided with a through groove through which the pressing member penetrates in the axial direction.

In this case, the pressing member can be inserted from the upstream side in the axial direction via the through groove provided in the upstream wall, and can be pressed against the isolation ring. Accordingly, attachment of the pressing member from the axial direction becomes easy, the isolation ring can be pressed against the downstream wall from the upstream side, and the sealing performance of the packing can be maintained.

Additionally, the casing may include an annular space which is formed on the axial upstream side of the isolation ring and on the radially inward on the inner peripheral side of the blade ring, with the outer peripheral surface of the predetermined isolation ring as atop face.

In this case, since the casing may include an annular space which is formed on the axial upstream side of the isolation ring and on the radially inward on the inner peripheral side of the blade ring, the predetermined isolation ring and the pressing member can be easily attached in the axial direction.

Additionally, the predetermined isolation ring may be provided with a guide portion along which the pressing member arranged on the upstream side of the predetermined isolation ring is slidable in a radial direction, an isolation ring groove which is recessed toward the radially outward side and which the predetermined isolation ring enters and the pressing member enters may be formed on the inner peripheral side of the blade ring portion, and the pressing member may be put into the isolation ring groove from the radially inward side and attached to the blade ring portion.

In this case, the pressing member may be provided with a guide projection portion which protrudes to the downstream side in the axial direction and engages the guide portion of the predetermined isolation ring, and an attached portion, which is located on the radially outward side in the predetermined isolation ring and enters the isolation ring groove, may have the thickness of a radially top which is shorter than the maximum groove width of the isolation ring groove in the axial direction at least by the axial length of the guide projection portion.

In this case, since the predetermined isolation ring can be attached and detached so the axial direction if the thickness of the axial top of the attached portion of the predetermined isolation ring is made shorter than the maximum groove width of the isolation ring groove in the axial direction at least by the axial protruding length of the top projection, the packing between the predetermined isolation ring and the upstream member or the downstream member can be inserted in the axial direction, and there is no concern of damaging the surface of the packing during insertion.

Additionally, an inclined face that is gradually directed to the downstream side as it goes toward the radially outward side may be formed in an upstream wall of the isolation ring groove.

In this case, in the process in which the pressing member is pushed into the isolation ring groove, the pressing member can be moved to the downstream side while being moved to the radially outward side by the inclined face as a movement guide portion. Therefore, a pressing force of the pressing member to the isolation ring becomes larger, and the sealing performance of the packing is further improved.

Additionally, in the gas turbine, the predetermined isolation ring may have a plurality of isolation segments, and the plurality of isolation segments may be lined up in a circumferential direction to form an annular shape, thereby constituting the predetermined isolation ring, and each of the plurality of isolation segments may be provided with a circumferential opposite face to the pressing member in the circumferential direction which regulates the relative movement of the pressing member in the circumferential direction.

In the gas turbine, since the relative movement of the isolation segments in the circumferential direction with respect to the pressing member is regulated, the isolation segments can be positioned in the circumferential direction by fixing the pressing member to the blade ring portion (integrated blade ring).

Additionally, in the gas turbine, the upstream member may have a plurality of upstream member segments, and the plurality of upstream member segments may be lined up in a circumferential direction to form an annular shape, and each of the plurality of upstream member segments may be provided with a circumferential opposite face to the pressing member in the circumferential direction which regulates the relative movement of the pressing member in the circumferential direction.

In the gas turbine, since the movement of the upstream member segments in the circumferential direction with respect to the pressing member is regulated, the upstream member segments can be positioned in the circumferential direction by fixing the pressing member to the blade ring portion.

Additionally, in the gas turbine, the upstream member may have a plurality of upstream member segments, and the plurality of upstream member segments may be lined up in a circumferential direction to form an annular shape, a circumferential regulating member may be provided to regulate the relative movement of the upstream member segment in the circumferential direction with respect to the predetermined isolation ring, and the predetermined isolation ring and the upstream member segment may be respectively provided with recesses which mutually different portions of the circumferential regulating member enter and which regulate the relative movement of the circumferential regulating member in the circumferential direction.

In the gas turbine, positioning of the upstream member segment in the circumferential direction with respect to the predetermined isolation ring can be performed by putting the circumferential regulating member into the recess of the predetermined isolation ring and the recess of the upstream member segment.

Additionally, in the gas turbine, the downstream member may have a plurality of downstream member segments, and the plurality of downstream member segments may be lined up in a circumferential direction to form an annular shape, a circumferential regulating member may be provided to regulate the relative movement of the downstream member segment in the circumferential direction with respect to the blade ring portion, and the blade ring portion and the downstream member segment may be respectively provided with recesses which mutually different portions of the circumferential regulating member enter and which regulate the relative movement of the circumferential regulating member in the circumferential direction.

In the gas turbine, positioning of the downstream member segment in the circumferential direction with respect to the blade ring portion can be performed by putting the circumferential regulating member into the recess of the blade ring portion and the recess of the downstream member segment.

Additionally, the pressing member may be attached to the blade ring portion with a bolt which has a bolt head and a shank having one end fixed to the bolt head and a male thread formed at least at the other end thereof, the pressing member, the blade ring portion, and the predetermined isolation ring may be respectively provided with a through hole which passes through each of them in the axial direction and which communicates with each other, and which the shank of the bolt enters, and the inner peripheral surface of the through hole of one of the pressing member and the blade ring portion may be provided with a female thread into which the male thread of the bolt is screwed.

In the gas turbine, by screwing the bolt as a fixing tool into the female thread as a movement guide portion formed in the inner peripheral surface of the through hole of one of the pressing member and the blade ring portions, the pressing member and the predetermined isolation ring can be feed to the integrated blade ring (blade ring portion) while moving the pressing member to the downstream side.

Additionally, the pressing member may be attached to the blade ring portion with a bolt which has a bolt head and a shank having one end fixed to the bolt head and a male thread formed at least at the other end thereof and the shank of the bolt may engage the pressing member and the blade ring portion.

Additionally, the gas turbine may further include at feast one packing of a packing between the upstream member and the predetermined isolation ring which is elastically deformed in the axial direction to perform sealing, and a packing between the downstream member and the predetermined isolation ring which is elastically deformed in the axial direction to perform sealing.

In the gas turbine, in the process in which the predetermined isolation ring or the upstream member moves to the downstream side, the packing between the predetermined isolation, ring and the downstream member or the upstream member is elastically deformed in the axial direction, and the predetermined isolation ring and the downstream member or the upstream member are sealed therebetween. Accordingly, in the gas turbine, the packing between the respective parts is easy to be elastically deformed, and assembly of the casing can be easily performed.

Additionally, in the gas turbine, a plurality of first vanes which constitute a first vane stage of the plurality of vane stages may be attached to the first blade ring portion among the two or more blade ring portions, and a plurality of second vanes which constitute a second vane stage arranged downstream of the first vane stage may be attached to the second blade ring portion arranged downstream of the first blade ring portion; the predetermined isolation ring may include a second upstream isolation ring which attaches a downstream portion of the first ring segment which is arranged between the first vane stage and the second vane stage among the plurality of ring segments to the second blade ring portion, and which attaches an upstream portion in an outer shroud of the second vane to the second blade ring portion; and the upstream member may be the first ring segment and the downstream member may be the second vane stage.

In this case, the predetermined isolation ring may include a second downstream isolation ring winch attaches an upstream portion of a second ring segment which is arranged on the downstream side of the second vane stage among the plurality of ring segments to the second blade ring portion, and which attaches a downstream portion in an outer shroud of the second vane to the second blade ring portion; the upstream member may be the second vane stage; and the downstream member may be the second ring segment.

Moreover, the predetermined isolation ring may include a first downstream isolation ring which attaches an upstream portion of the first ring segment to the first blade ring portion and which attaches a downstream portion in an outer shroud of the first vane to the first blade ring portion, and the upstream member may be the first vane stage and the downstream member may be the first ring segment.

Advantageous Effects of Invention

In the invention, the casing can be easily assembled even with the integrated blade ring while compressing an elastic metal packing between the respective parts.

BRIEF DESCRIPTION OF THE DRAWINGS

FIG. 11 is a cross-sectional view of main portions of a gas turbine in a second embodiment related to the invention.

BEST MODE FOR CARRYING OUT THE INVENTION

Hereinafter, embodiments of a gas turbine related to the invention will be described in detail with reference to the drawings.

First Embodiment

First, a gas turbine as a first embodiment related to the invention will be described with reference to FIGS. 1 to 10.

Figure 1:
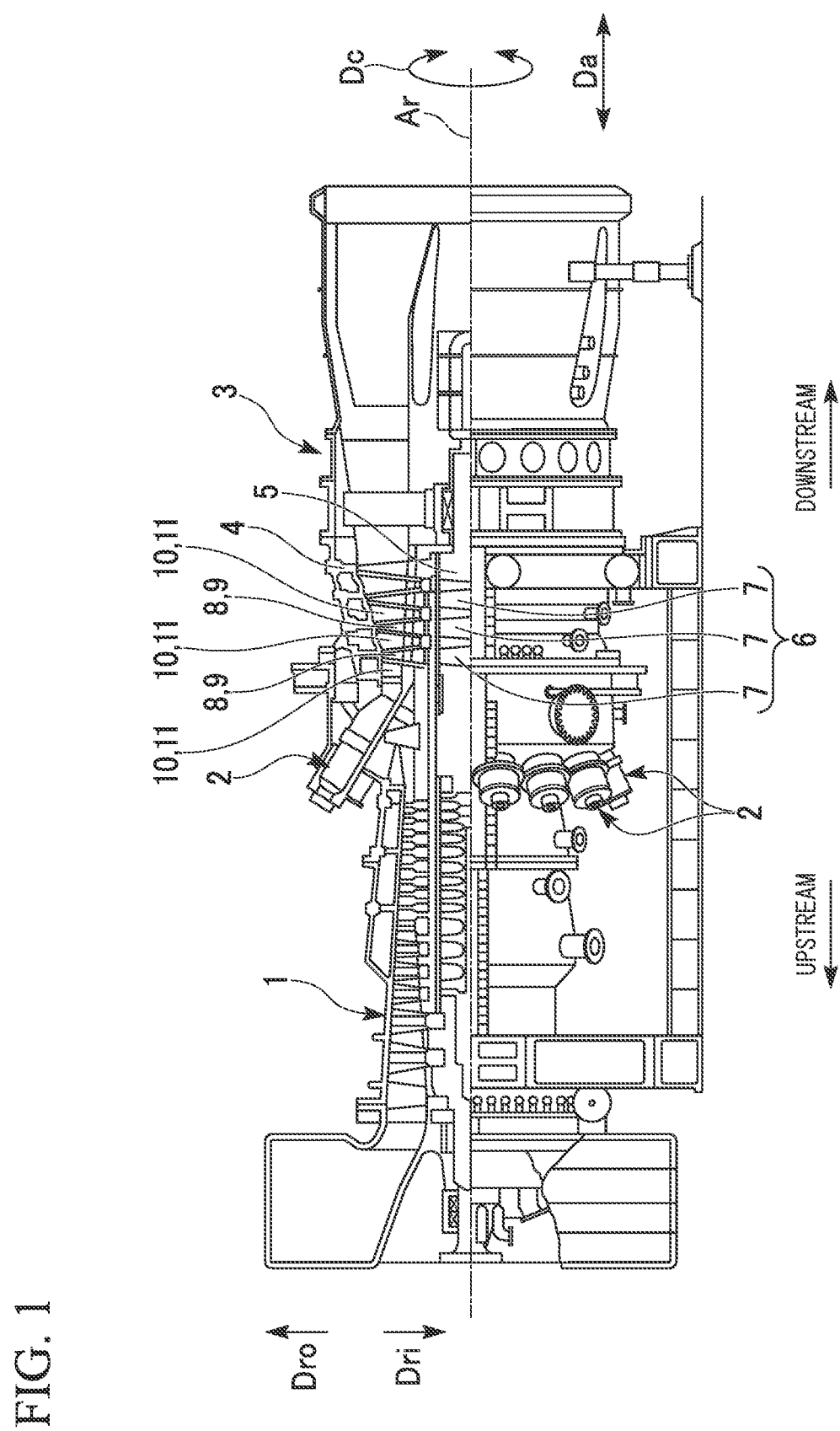
FIG. 1 is an overall side view in which main portions of a gas turbine in a first embodiment related to the invention are cut out.

As shown in FIG. 1, the gas turbine of the present embodiment is equipped with a compressor 1 which compresses the outside air to generate compressed air, a plurality of combustors 2 which mix and combust the fuel from a fuel supply source with the compressed air to generate combustion gas, and a turbine 3 which is driven by the combustion gas.

The turbine 3 is equipped with a casing 4, and a rotor 5 which rotates within the casing 4. The rotor 5 is connected with a generator (not shown) which generates electricity with the rotation of the rotor 5. In addition, in the following, a direction in which a rotation axis Ar, which is the rotation center of the rotor 5, extends is defined as an axial direction Da. Additionally, in a radial direction Dr with respect to the rotation axis Ar, the side approaching the rotation axis Ar is defined as radially inward side Dri and the side away from the rotation axis Ar is defined as radially outward side Dro. Moreover, the upstream side of the flow of combustion gas in the axial direction Da and the downstream side thereof in the axial direction Da are simply referred to as the upstream side and the downstream side.

The rotor 5 is equipped with a rotor body 6 which extends in the axial direction Da around the rotation axis Ar, and a plurality of blade stages 8 which are lined up in the axial direction Da and fixed to the rotor body 6. All the respective blade stages 8 have a plurality of blades 9 lined up in the circumferential direction Dc with respect to the rotation axis Ar. The rotor body 6 has, in every blade stage 8, a rotor disc 7 to which the plurality of blades 9 which constitute the blade stage 8 are fixed. In the rotor body 6, the rotor discs 7 of the respective blade stages 8 are lined up in the axial direction Da and connected to each other.

A plurality of vane stages 10 lined, up in the axial direction Da are fixed to the inner peripheral side of the casing 4. Each of the vane stages 10 is arranged on the upstream side of any of the blade stages 8. The respective vane stages 10 have a plurality of vanes 11 lined up in the circumferential direction Dc with respect to the rotation axis Ar.

Figure 2:
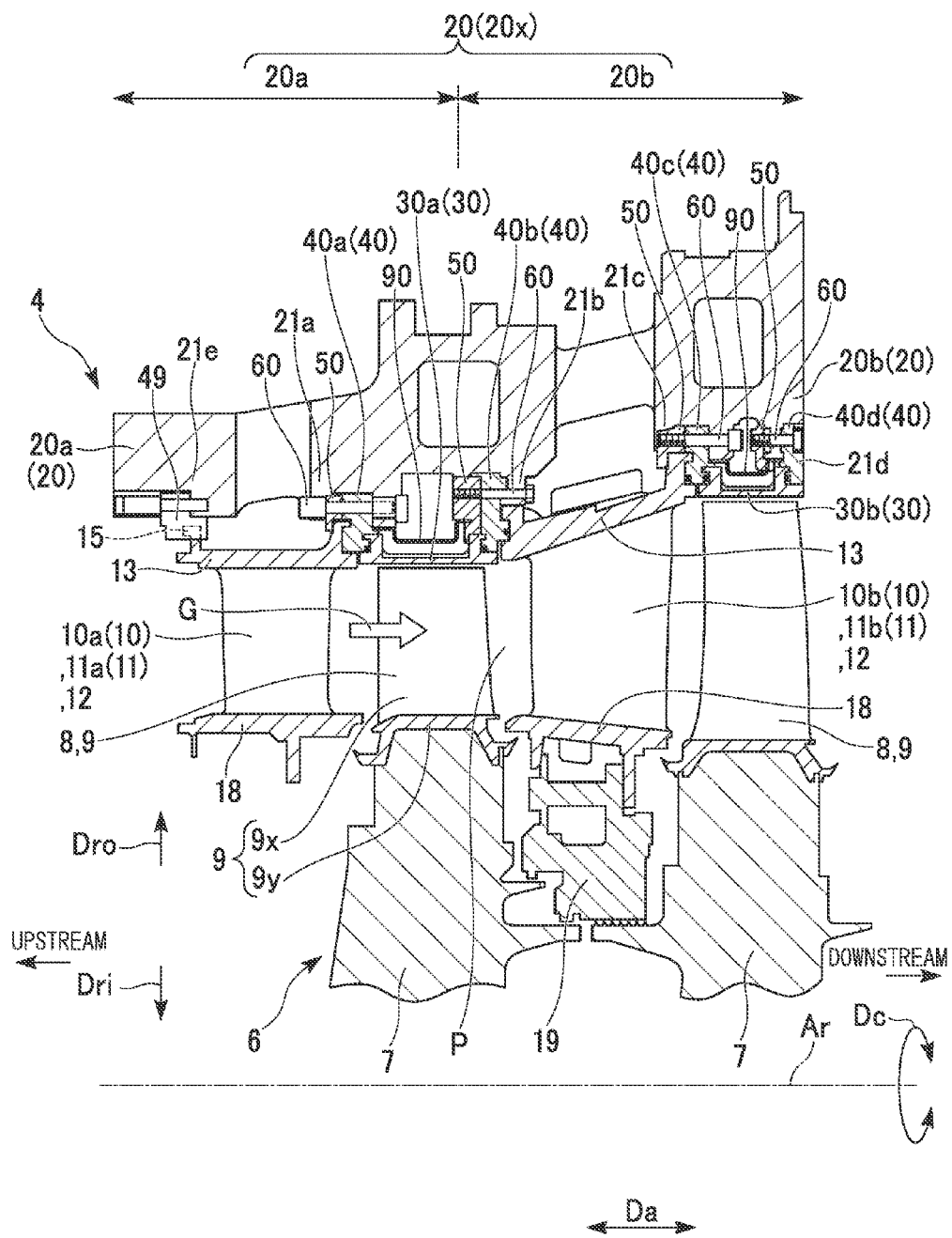
FIG. 2 is a cross-sectional view of the main portions of the gas turbine in the first embodiment related to the invention.
Figure 3:
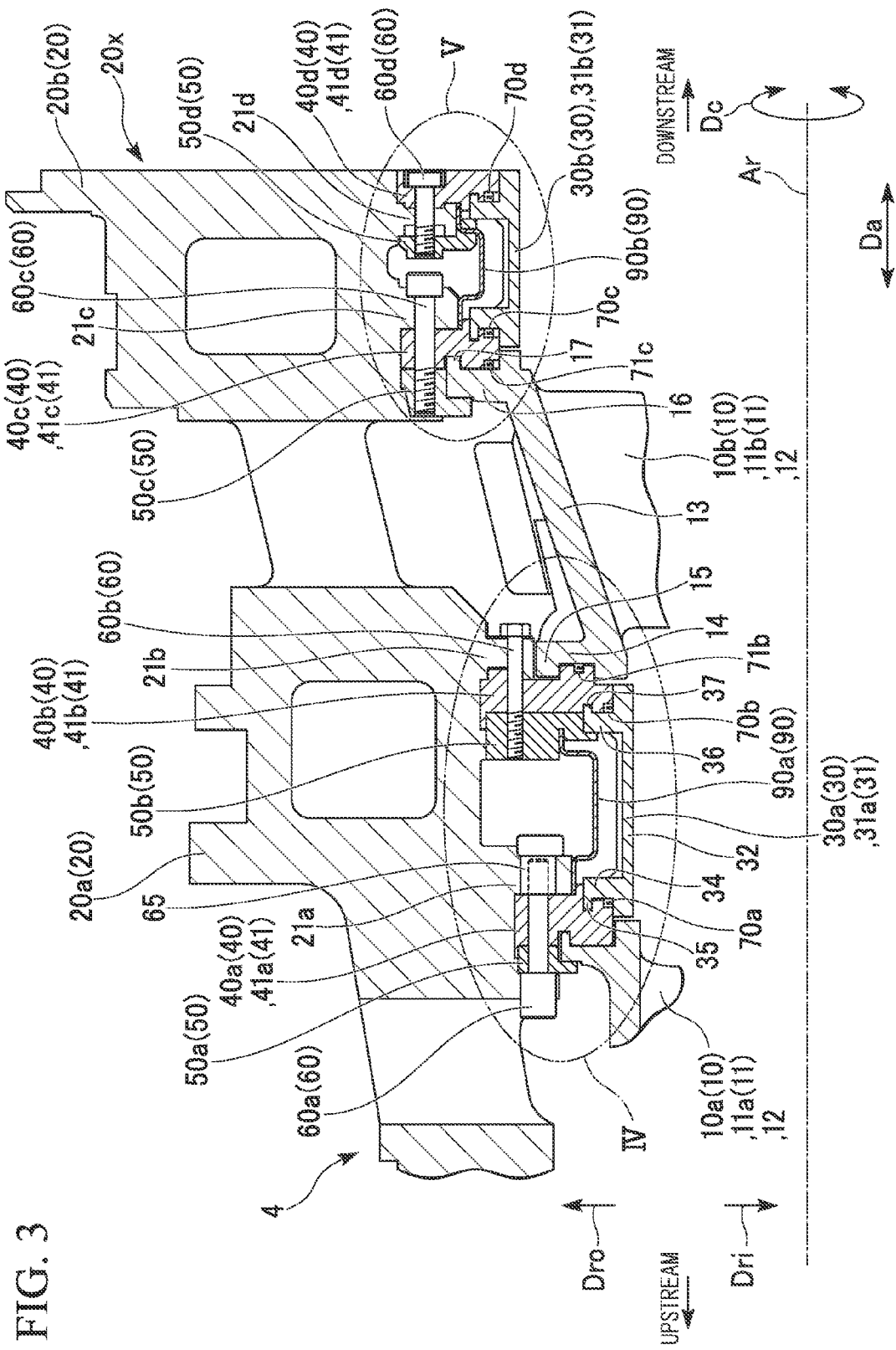
FIG. 3 is a cross-sectional view around an integrated blade ring in the first embodiment related to the invention.

The casing 4, as shown in FIGS. 2 and 3, is equipped with blade ring portions 20, ring segments 30, isolation rings 40, pressing members 50, bolts 60, and shield plates 90. The blade ring portion 20 is a member which covers the vanes 11 and the blades 9 of the respective stages, and is annularly formed. The ring segment 30 is a member which is annularly arranged between the plurality of vane stages 10 on the inner peripheral side of the blade ring portion 20 and on the outer peripheral side of the blades 9. The isolation ring 40 is an annularly formed member for attaching the vanes 11 and the ring segment 30 to the blade ring portion 20. The pressing member 50 is a member which presses the isolation ring 40 toward the downstream side, and the pressing member 50 is fixed to the blade ring portion 20 with the bolt (fixing tool) 60. The shield plate 90 is arranged on the outer peripheral side of the ring segment 30 and on the inner peripheral side of the blade ring portion 20. Additionally, the casing 4 is equipped with an annular cylinder (not shown) which covers the outer periphery of the blade ring portion 20.

Each vane 11 has a vane body 12 which extends in the radial direction Dr, an outer shroud 13 which is provided on the radially outward side Dro of the vane body 12, and an inner shroud 18 which is provided on the radially inward side Dri of the vane body 12.

The outer shroud 13 has an upstream leg 14 (FIG. 3) which extends from an upstream portion thereof to the radially outward side Dro, and a downstream leg 16 which extends from a downstream portion thereof to the radially outward side Dro. An upstream projection 15 which protrudes toward the upstream side is formed at a radially outward side end of the upstream leg 14. Additionally, a downstream projection 17 which protrudes toward the downstream side is formed at the radially outward side end of the downstream leg 16.

Bach blade 9 (FIG. 2) has a blade body 9x which extends in the radial direction Dr, a platform 9y which is provided on the radially inward side Dri of the blade body 9x, and a blade root (not shown) which is provided on the radially inward side Dri of the platform 9y. The blade root is embedded in the rotor disc 7, and the blade 9 is fixed to the rotor disc 7.

A combustion gas flow channel P through which the high-temperature and high-pressure combustion gas G from the combustor 2 flows is formed between the inner shrouds 18 and the outer shrouds 13 of the vanes 11 and between the platforms 9y of the blades 9, and the ring segments 30 which face these platforms in the radial direction Dr.

A plurality of first vanes 11a which constitute the first vane stage 10a furthest away on the upstream side among the plurality of vane stages 10 are attached to a first blade ring portion 20a of the plurality of blade ring portions 20. Additionally, a plurality of second vanes 11b which constitute a second vane stage 10b arranged on the downstream side of the first vane stage 10a are attached to a second blade ring portion 20b of the plurality of blade ring portions 20. The first blade ring portion 20a and the second blade ring portion 20b are integrally formed, and form an integrated blade ring 20x (blade ring portion 20).

In addition to the plurality of first vanes 11a which constitute the first vane stage 10a and the plurality of second vanes 11b which constitute the second vane stage 10b, a first ring segment 30a which is arranged between the first vane stage 10a and the second vane stage 10b and a second ring segment 30b which is arranged on the downstream side, of the second vane stage 10b are attached to the blade ring portion 20. Moreover, the blade ring portioned is equipped with a fixing block 49, a first downstream isolation ring 40a, a second upstream isolation ring 40b, a second downstream isolation ring 40c, and a third isolation ring 40d. The fixing block 49 is a member for attaching upstream portions of the outer shrouds 13 of the first vanes 11a to the blade ring portion 20. The first downstream isolation ring 40a is a member for attaching downstream portions of the outer shrouds 13 of the first vanes 11a and an upstream portion of the first ring segment 30a to the blade ring portion 20. The second upstream isolation ring 40b is a member for attaching a downstream portion of the first ring segment 30a and upstream portions of the outer shrouds 13 of the second vanes 11b to the blade ring portion 20. The second downstream isolation ring 40c is a member for attaching downstream portions of the outer shrouds 13 of the second vanes 11b, and an upstream portion of the second ring segment 30b to the blade ring portion 20. The third isolation ring 40d is a member for attaching a downstream portion of the second ring segment 30b to the blade ring portion 20.

For the attachment of the first downstream isolation ring 40a, the second upstream isolation ring 40b. The second downstream isolation ring 40c, and the third isolation ring 40d to the blade ring portion 20, the aforementioned pressing members 50 which press the isolation rings 40 to the downstream side, and the bolts 60 as fixing tool for fixing this pressing member to the blade ring portion 20 are used.

A first upstream attaching portion 21e to which the fixing block 49 for the first vanes 11a is attached and a first downstream attaching portion 21a to which the first downstream isolation ring 40a and a first downstream pressing member 50a are attached are formed on the inner peripheral side of the first blade ring portion 20a of the blade ring portion 20. Additionally, a second upstream attaching portion 21b to which the second upstream isolation ring 40b and a second upstream pressing member 50b are attached, a second downstream attaching portion 21c to which the second downstream isolation ring 40c and a second downstream pressing member 50c are attached, and a third attaching portion 21d to which the third isolation ring 40d and a third pressing member 50d are attached are formed on the inner peripheral side of the second blade ring portion 20b of the blade ring portion 20. All of the first downstream attaching portion 21a, the second upstream attaching portion 21b, the second downstream attaching portion 21c, and the third attaching portion 21d protrude from the blade ring portion 20 to the radially inward side Dri. Additionally, the respective attaching portions are lined up in order of the first upstream attaching portion 21e, the first downstream attaching portion 21a, the second upstream attaching portion 21b, the second downstream attaching portion 21c, and the third attaching portion 21d from the upstream side toward the downstream side.

Figure 4:
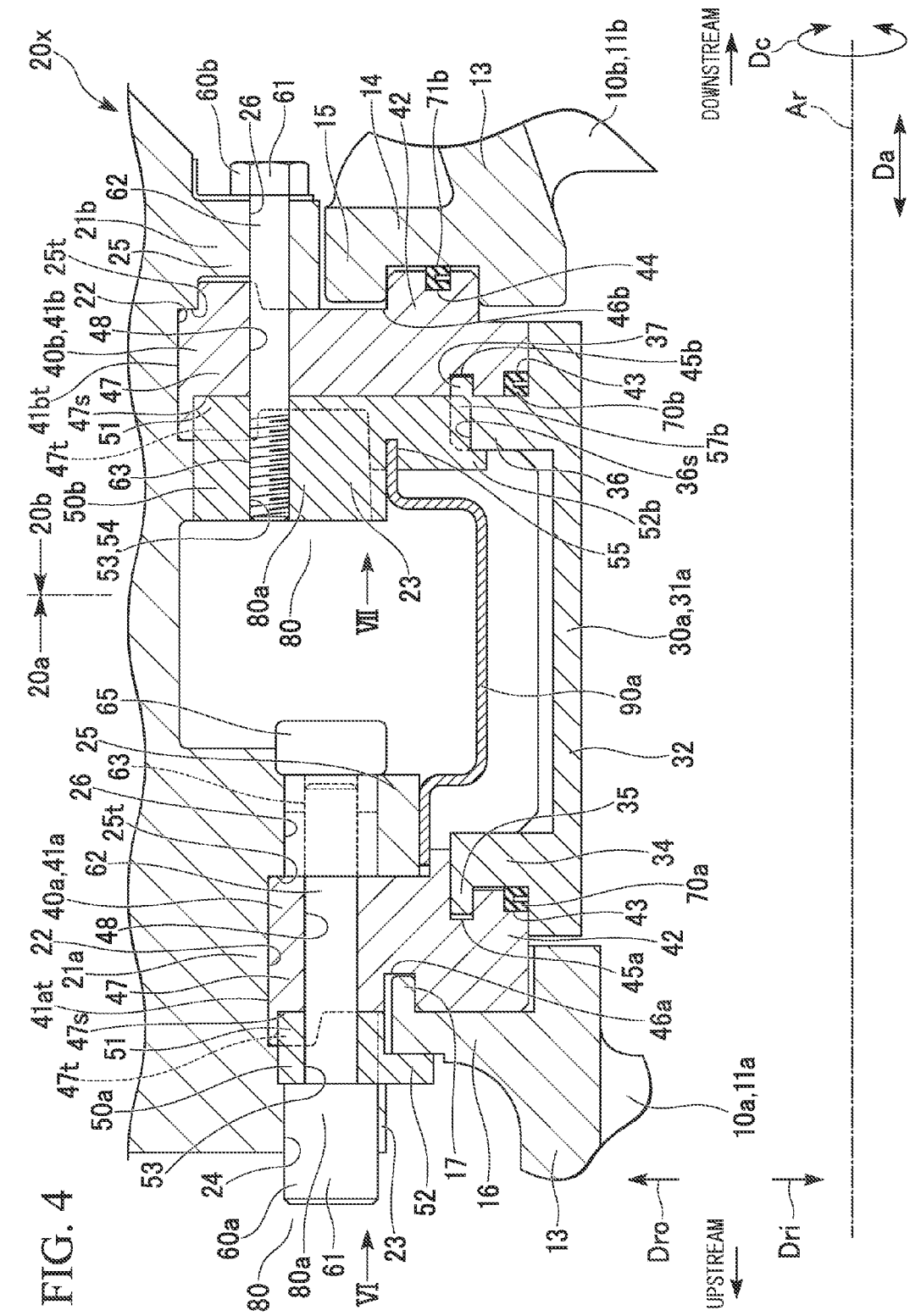
FIG. 4 is an enlarged view of section IV in FIG. 3.
Figure 5:
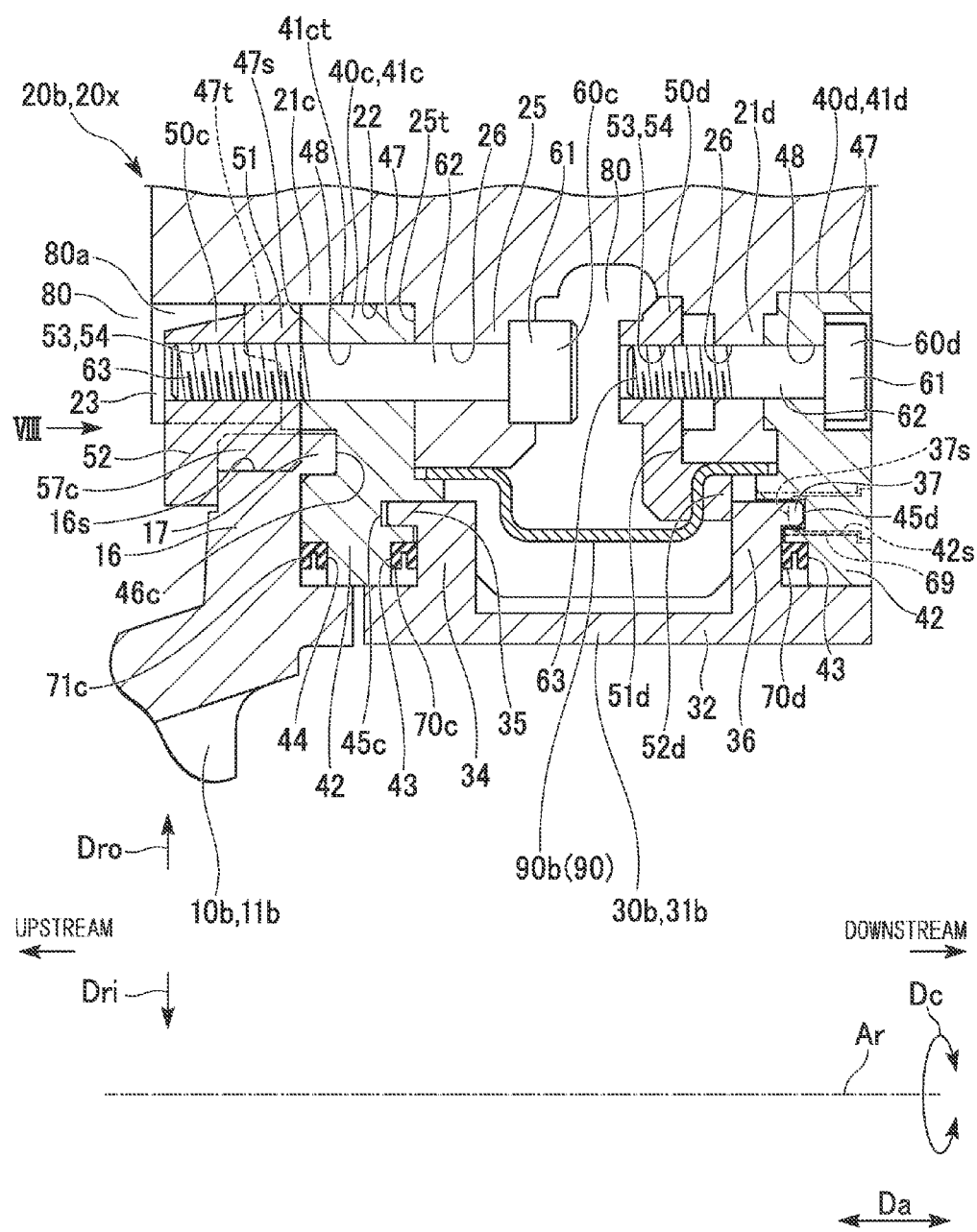
FIG. 5 is an enlarged view of section V in FIG. 3.

As shown in FIGS. 4 and 5, as for the first downstream attaching portion 21a, the second upstream attaching portion 21b, and the second downstream, attaching portion 21c, a convex upstream wall 23 and a convex downstream wall 25 which extend further toward the radially inward side Dri than the outer peripheral surface of the isolation ring 40 from the blade ring portion 20 are arranged on the upstream and downstream sides in the axial direction adjacent to the isolation ring 40 with each isolation ring 40 therebetween. That is, in the first downstream attaching portion 21a, the second upstream attaching portion 21b, and the second downstream attaching portion 21c, the upstream wall 23 and the downstream wall 25 form an annular convex object which extends from the blade ring portion 20 to the radially inward side Dri, and the isolation ring 40 is inserted in the circumferential direction Dc into an isolation ring space sandwiched and formed between the both. That is, the blade ring portion 20 has a structure where each isolation ring 40 is sandwiched by the upstream wall 23 and the downstream wall 25 in the axial direction. Additionally, the outer peripheral surface of each isolation ring 40 inserted in the circumferential direction Dc, which is directed to the radially outward side Dro, comes into contact with the inner peripheral side of the blade ring portion 20. The inner peripheral surface of the blade ring portion 20 which is directed to the radially inward side Dri forms an isolation ring groove 22 which comes into contact with the outer peripheral surface of each isolation ring 40.

The respective ring segments 30 including the first ring segment 30a and the second ring segment 30b have a plurality of split segments 31 (FIG. 3). The plurality of split segments 31 constitute the ring segment 30 by being lined up in the circumferential direction Dc with respect to the rotation axis Ar to form an annular shape.

As shown in FIGS. 3 to 5, each split segment 31 has a split segment body 32 which spreads in the circumferential direction Dc, an upstream leg 34 which extends from an upstream portion of this split segment body 32 to the radially outward side Dro, and a downstream leg 36 which extends from a downstream portion of the split segment body 32 to the radially outward side Dro. An upstream projection 35 which protrudes toward the upstream side is formed at a radially outward side end of the upstream leg 34. Additionally, a downstream projection 37 which protrudes toward the downstream side is formed at the radially outward side end of the downstream leg 36.

Figure 7:
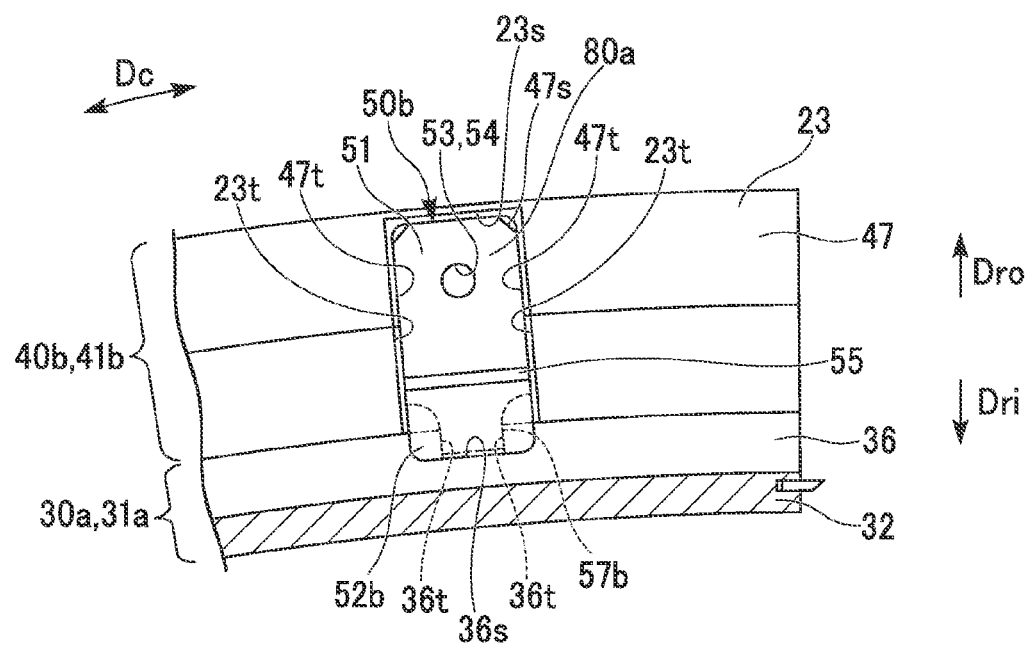
FIG. 7 is a view as seen from arrow VII in FIG. 4.
Figure 8:
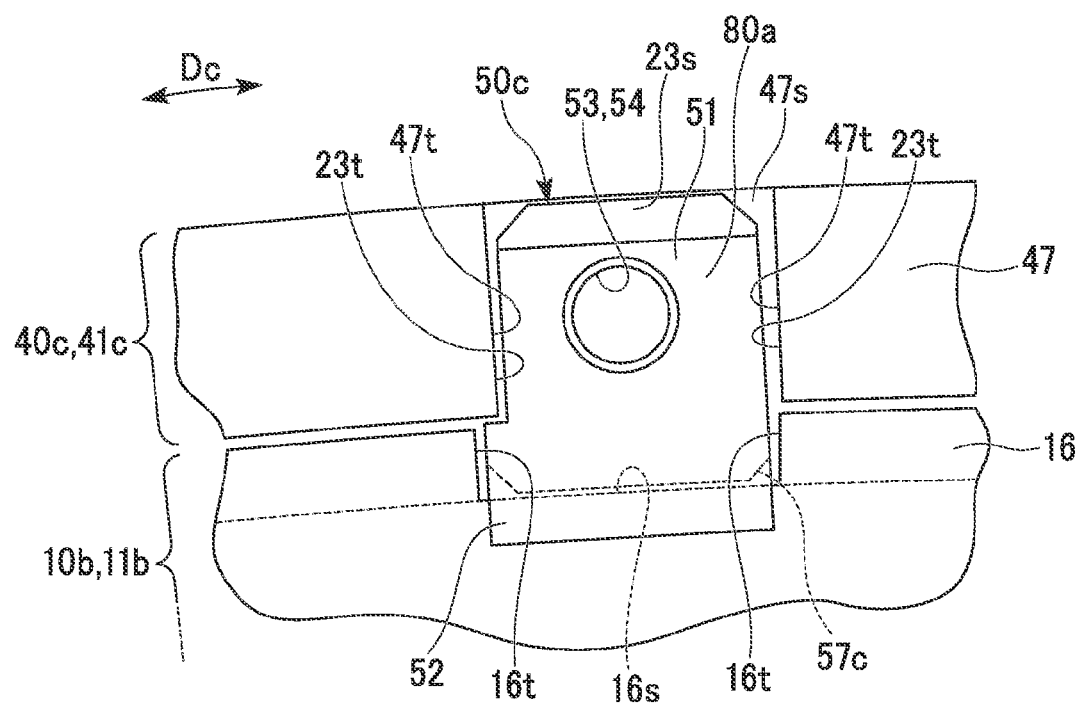
FIG. 8 is a view as seen front arrow VIII in FIG. 5.
Figure 9A:
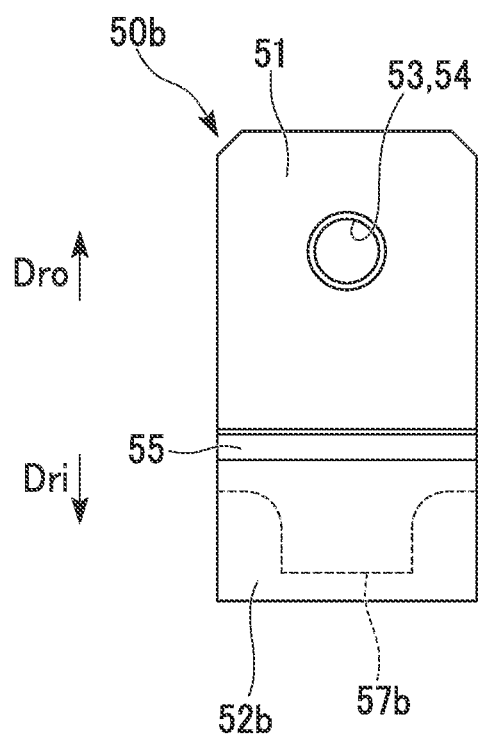
FIG. 9A is a front view of a second upstream pressing member in the first embodiment related to the invention.
Figure 9B:
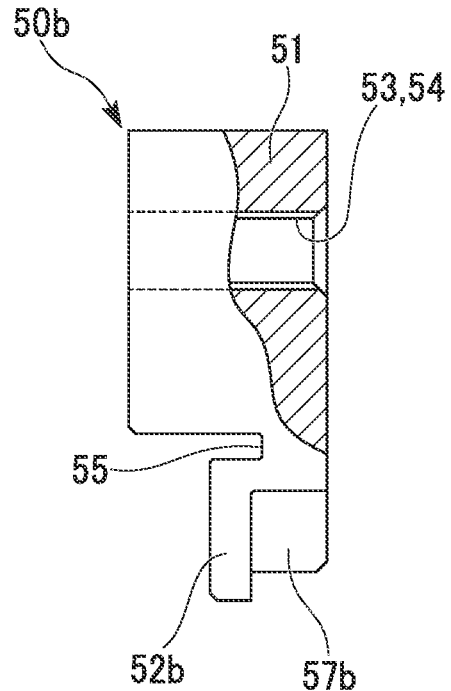
FIG. 9B is a side view of the second upstream pressing member in the first embodiment related to the invention.

As shown in FIGS. 4 and 7, the downstream leg 36 in each of the plurality of first split segments 31a which constitute the first ring segment 30a is provided with a pressing member groove 36s which is recessed from the upstream side to the downstream side and which a portion of the second upstream pressing member 50b enters. In addition, although FIG. 7 is a view as seen from arrow VII in FIG. 4, a first shield plate 90a is not shown. As shown in FIGS. 5 and 8, the downstream leg 16 in each of the plurality of second vanes 11b which constitute the second vane stage 10b is provided with a pressing member groove 16s which is recessed from the upstream side to the downstream side and which a portion of tire second downstream pressing member 50c enters. In addition, although FIG. 8 is a view as seen from arrow VIII in FIG. 5, the blade ring portion 20 is not shown. Each pressing member groove 36s or 16s is provided with a pair of circumferential opposite faces 36t or 16t to each other in the circumferential direction Dc. Additionally, as shown in FIG. 5, the downstream projection 37 in each of a plurality of second spilt segments 31b which constitute the second ring segment 30b is provided with a pin groove 37s which is recessed from the downstream side to the upstream side.

Each isolation ring 40 has a plurality of isolation segments 41. The plurality of isolation segments 41 constitute the isolation ring 40 by being lined up in the circumferential direction Dc with respect to the rotation axis Ar to form an annular shape. Each isolation segment 41 has an inside ring attaching portion 42 to which the vane 11 and/or the split segment 31 are attached, and an attached portion 47 which is located on the radially outward side Dro with respect to the inside ring attaching portion 42, and is attached to the blade ring portion 20. The attached portion 47 is provided with a through hole 48 which passes through the attached portion 47 in the axial direction Da and through which a shank 62 of the bolt 60 is inserted.

As shown in FIG. 4, the inside ring attaching portion 42 of each of the plurality of first downstream isolation segments 41a which constitute the first downstream isolation ring 40a is provided with a first vane attachment groove 46a which is recessed from the upstream side to the downstream side, and which the downstream projection 17 of the first vane 11a enters. Moreover, the inside ring attaching portion 42 of the first downstream isolation segment 41a is provided with a first ring segment attachment groove 45a which is recessed from the downstream side to the upstream side and which the upstream projection 35 of each of the first split segments 31a which constitute the first ring segment 30a enters. Additionally, the inside ring attaching portion 42 of the first downstream isolation segment 41a is provided with a packing groove 43 which is recessed from the downstream side to the upstream side and which a first ring segment upstream packing 70a enters.

Figure 6:
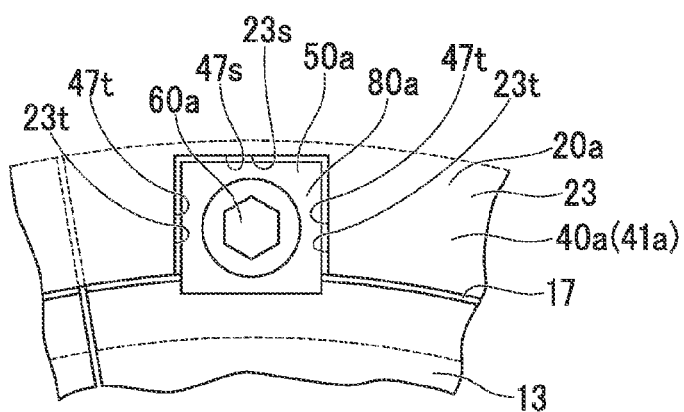
FIG. 6 is a view as seen from arrow VI in FIG. 4.

Additionally, as shown in FIGS. 4 and 6, the attached portion 47 of the first downstream isolation segment 41a is provided with a pressing member groove 47s which is recessed from the upstream side to the downstream side and which a portion of the first downstream pressing member 50a enters. The pressing member groove 47s is provided with a pair of circumferential opposite faces 47t to each other in the circumferential direction Dc. In addition, FIG. 6 is a view as seen from arrow VI in FIG. 4.

The inside ring attaching portion 42 of each of a plurality second upstream isolation segments 41b which constitute the second upstream isolation ring 40b is provided with a first ring segment attachment groove 45b which is recessed from the upstream side to the downstream side and which the downstream projection 37 of the first split segment 31a enters, and the packing groove 43 which is recessed from the upstream side to the downstream side and which a first ring segment downstream packing 70b enters. Moreover, the inside ring attaching portion 42 of the second upstream isolation segment 41b is provided with a second vane attachment groove 46b which is recessed from the downstream side to the upstream side and which the upstream projection 15 of the second vane 11b enters, and a packing groove 44 which is recessed from the downstream side to the upstream side and which a second vane upstream packing 71b enters.

Additionally, as shown in FIGS. 4 and 7, the attached portion 47 of the second upstream isolation segment 41b is provided with the pressing member groove 47s which is recessed from the upstream side to the downstream side and which a portion of the second upstream pressing member 50b enters. The pressing member groove 47s is provided with the pair of circumferential opposite faces 47t to each other in the circumferential direction Dc.

As shown in FIG. 5, the inside ring attaching portion 42 of each of a plurality of second downstream isolation segments 41c which constitute the second downstream isolation ring 40c is provided with a second vane attachment groove 46c which is recessed from the upstream side to the downstream side and which the downstream projection 17 of the second vane 11b enters, and a packing groove 44 which is recessed from the upstream side to the downstream side and which a second vane downstream packing 71c enters. Moreover, the inside ring attaching portion 42 of the second downstream isolation segment 41c is provided with a second ring segment attachment groove 45c which is recessed from the downstream side to the upstream side and which the upstream projection 35 of a second split segment 31b enters, and the packing groove 43 which is recessed from the downstream side to the upstream side and which a second ring segment upstream packing 70c enters.

Additionally, as shown in FIGS. 5 and 8, the attached portion 47 of the second downstream isolation segment 41c is provided with the pressing member groove 47s which is recessed from the upstream side to the downstream side and which a portion of the second downstream pressing member 50c enters from the upstream side. The pressing member groove 47s is provided with the pair of circumferential opposite faces 47t to each other in the circumferential direction Dc.

The inside ring attaching portion 42 of each of a plurality of third isolation segments 41d which constitute the third isolation ring 40d is provided with a second ring segment attachment groove 45d which is recessed from the upstream side to the downstream side and which the downstream projection 37 of the second split segment 31b enters, and the packing groove 43 which is recessed from the upstream side to the downstream side and which a second ring segment downstream packing 70d enters. Moreover, the inside ring attaching portion 42 is provided with a pin hole 42s which penetrates from the downstream side to the upstream side.

As shown in FIGS. 4 and 6, the first downstream pressing member 50a has an isolation ring regulating portion 51 which enters the pressing member groove 47s in the attached portion 47 of the first downstream isolation segment 41a, and a vane pressing portion 52 which is located further toward the radially inward side Dri than the isolation ring regulating portion 51 and comes into contact with the downstream leg 16 of the first vane 11a. The isolation ring regulating portion 51 is provided with a through hole 53 which penetrates in the axial direction Da and communicates with the through hole 48 of the first downstream isolation segment 41a. Both the through hole 53 of the first downstream pressing member 50a and the through hole 48 of the first downstream isolation segment 41a form a hole through which the shank 62 of a first downstream bolt 60a is inserted.

As shown in FIGS. 4, 7, 9A, and 9B, the second upstream pressing member 50b has the isolation ring regulating portion 51, a ring segment pressing portion 52b, and a ring segment regulating portion 57b. The isolation ring regulating portion 51 is a member which enters the pressing member groove 47s in the attached portion 47 of the second upstream isolation segment 41b. The ring segment pressing portion 52b is a member which comes into contact with an upstream face of the downstream leg 36 in the first split segment 31a. The ring segment regulating portion 57b is a member which enters the pressing member groove 36s of the first split segment 31a. The ring segment pressing portion 52b is located further toward the radially inward side Dri than the isolation ring regulating portion 51. Additionally, the ring segment regulating portion 57b is located farther toward the radially inward side Dri than the isolation ring regulating portion 51 and further toward the downstream side than the ring segment pressing portion 52b. The isolation ring regulating portion 51 is provided with the through hole 53 which passes through the isolation ring regulating portion 51 in the axial direction Da and communicates with the through hole 48 of the second upstream isolation segment 41b. The inner peripheral surface of the through hole 53 is provided with a female thread (movement guide portion) 54. Both the through hole 53 of the second upstream pressing member 50b and the through hole 48 of the second upstream isolation segment 41b form a hole through which the shank 62 of a second upstream bolt 60b is inserted. Moreover, the isolation ring regulating portion 51 is provided with a shield plate groove 55 which is recessed from the upstream side toward the downstream side, and which a downstream end of the first shield plate 90a enters.

As shown in FIGS. 5 and 8, the second downstream pressing member 50c has the isolation ring regulating portion 51, the vane pressing portion 52, and a vane regulating portion 57c. The isolation ring regulating portion 51 is a member which enters the pressing member groove 47s in the attached portion 47 of the second downstream isolation segment 41c. The vane pressing portion 52 is a member which is located further toward the radially inward side Dri than the isolation ring regulating portion 51 and comes into contact with an upstream thee of the downstream leg 16 of the second vane 11b. The vane regulating portion 57c is a member which enters the pressing member groove 16s of the second vane 11b. The vane pressing portion 52 is located further toward the radially inward side Dri than the isolation ring regulating portion 51. Additionally, the vane regulating portion 57*c* is located further toward the radially inward side Dri than the isolation ring regulating portion 51 and further toward the downstream side than the vane pressing portion 52. The isolation ring regulating portion 51 is provided with the through hole 53 which penetrates in the axial direction Da and communicates with the through hole 48 of the second downstream isolation segment 41*c*. The inner peripheral surface of the through hole 53 is provided with a female thread (movement guide portion) 54. Both the through hole 53 of the second downstream pressing member 50*c* and the through hole 48 of the second downstream isolation segment 41*c* form a hole through which the shank 62 of the second downstream bolt 60*c* is inserted.

The third pressing member 50*d* has a blade ring contact portion 51*d* which comes into contact with an upstream face in the third attaching portion 21*d* of the blade ring portion 20, and a ring segment pressing portion 52*d* which is located further toward the radially inward side Dri than the blade ring contact portion 51*d* and comes into contact with the downstream leg 36 of the second ring segment 30*b*. The blade ring contact portion 51*d* is provided with the through hole 53 which penetrates in the axial direction Da and communicates with the through hole 48 of the third isolation segment 41*d*. The inner peripheral surface of the through hole 53 is provided with the female thread 54. Both the through hole 53 of the third pressing member 50*d* and the through hole 48 of the third isolation segment 41*d* form a hole through which the shank 62 of a third bolt 60*d* is inserted.

As shown in FIG. 4, the first downstream attaching portion 21*a* of the blade ring portion 20 is provided with the isolation ring groove 22 which is recessed from the radially inward side Dri toward the radially outward side Dro and which the isolation ring regulating portion 51 of the first downstream pressing member 50*a* and the attached portion 47 of the first downstream isolation, segment 41*a* enter. That is, the annular upstream wall 23 and the annular downstream wall 25 which extend in a convex shape further toward the radially inward side Dri than an outer peripheral surface 41 at of the first downstream isolation segment 41*a* which is directed to the radially outward side Dro are formed adjacent to the first downstream isolation segment 41*a* on the upstream and downstream sides in the axial direction with the first downstream isolation segment 41*a* therebetween. Additionally, the groove-shaped isolation ring groove 22 is formed on the inner peripheral side of the blade ring portion 20 so as to be sandwiched by the upstream wall 23 and the downstream wall 25 in the axial direction.

The upstream wall 23 and the downstream wall 25 which form the isolation ring groove 22 are provided with a through groove 23*s* and a through hole 26 which penetrate in the axial direction Da and communicate with the through hole 53 of the first downstream pressing member 50*a* and the through hole 48 of the first downstream isolation segment 41*a*. Additionally, the through hole 26 of the downstream wall 25 forms a hole which a first downstream nut (movement guide portion) 65 enters, which is capable of being screwed to a male thread formed on the tip side of the shank 62 of the first downstream bolt 60*a*.

An upstream face of the downstream wall 25 of the first downstream attaching portion 21*a* faces a downstream face of the attached portion 47 in the first downstream isolation segment 41*a*, and forms an axial opposite face 25*t* which regulates the relative movement of the first downstream isolation segment 41*a* to the downstream side.

The second upstream attaching portion 21*b* of the blade ring portion 20 is provided with the isolation ring groove 22 which is recessed from the radially inward side Dri toward the radially outward side Dro and which the isolation ring regulating portion 51 of the second upstream pressing member 50*b* and the attached portion 47 of the second upstream isolation segment 41*b* enter. That is, the annular upstream wall 23 and the annular downstream wall 25 which extend in a convex shape further toward the radially inward side Dri than an outer peripheral surface 41*bt* of the second upstream isolation segment 41*b* which is directed to the radially outward side Dro are formed adjacent to the second upstream isolation segment 41*b* on the upstream and downstream sides in the axial direction with the second upstream isolation segment 41*b* therebetween. Additionally, the groove-shaped isolation ring groove 22 formed on the inner peripheral side of the blade ring portion 20 so as to be sandwiched by the upstream wall 23 and the downstream wall 25 in the axial direction is similar to the structure around the first downstream attaching portion 21*a*.

The downstream wall 25 of the isolation ring groove 22 is provided with the through hole 26 which penetrates in the axial direction Da and communicates with the through hole 53 of the second upstream pressing member 50*b* and the through hole 48 of the second upstream isolation segment 41*b*. The through hole 26 of the downstream wall 25 forms a hole through which the shank 62 of the second upstream bolt 60*b* is inserted, together with the through hole 53 of the second upstream pressing member 50*b* and the through hole 48 of the second upstream isolation segment 41*b*.

The upstream face of the downstream wall 25 of the second upstream attaching portion 21*b* faces the downstream face of the attached portion 47 in the second upstream isolation segment 41*b*, and forms the axial opposite face 25*t* which regulates the relative movement of the second upstream isolation segment 41*b* to the downstream side.

As shown in FIG. 5, the second downstream attaching portion 21*c* of the blade ring portion 20 is provided with the isolation ring groove 22 which is recessed from the radially inward side Dri toward the radially outward side Dro and which the isolation ring regulating portion 51 of the second downstream pressing member 50*c* and the attached portion 47 of the second downstream isolation segment 41*c* enter. That is, the annular upstream wall 23 and the annular downstream wall 25 which extend in a convex shape further toward the radially inward side Dri than an outer peripheral surface 41*ct* of the second downstream isolation segment 41*c* which is directed to the radially outward side Dro are formed adjacent to the second downstream isolation segment 41*c* on the upstream and downstream sides in the axial direction with the second downstream isolation segment 41*c* therebetween. Additionally, the groove-shaped isolation ring groove 22 formed on the inner peripheral side of the blade ring portion 20 so as to be sandwiched by the upstream wall 23 and the downstream wall 25 in the axial direction is similar to the structure around the first downstream attaching portion 21*a*.

The downstream wall 25 of the isolation ring groove 22 is provided with the through hole 26 which penetrates in the axial direction Da and communicates with the through hole 53 of the second downstream pressing member 50*c* and the through hole 48 of the second downstream isolation segment 41*c*. The through hole 26 of the downstream wall 25 forms a hole through which the shank 62 of the second downstream bolt 60*c* is inserted, together with the through hole 53 of the second downstream pressing member 50*c* and the through hole 48 of the second downstream isolation segment 41*c*.

The upstream face of the downstream wall 25 of the second downstream attaching portion 21c faces the downstream face of the attached portion 47 in the second downstream isolation segment 41c, and forms the axial opposite face 25t which regulates the relative movement of the second downstream isolation segment 41c to the downstream side.

The third attaching portion 21d of the blade ring portion 20 is provided with the through hole 26 which penetrates in the axial direction Da and communicates with the through hole 53 of the third pressing member 50d and the through hole 48 of the third isolation segment 41d. The through hole 26 of the third attaching portion 21d forms a hole through which the shank 62 of the third bolt 60 is inserted, together with the through hole 53 of the third pressing member 50d and the through hole 48 of the third isolation segment 41d.

A space 80 for accommodating each pressing member and attaching each pressing member from the upstream side in the axial direction is provided on the axial upstream side of each pressing member in the first downstream attaching portion 21a, the second upstream attaching portion 21b, and the second downstream attaching portion 21c of the blade ring portion 20. The space 80 is formed as an annular space surrounded by the inner peripheral side of the blade ring portion and the outer peripheral surface of each stage vane or the ring segment.

In addition, all the respective packings described above are elastic metal packings which are elastically deformable in the axial direction Da.

Figure 10:
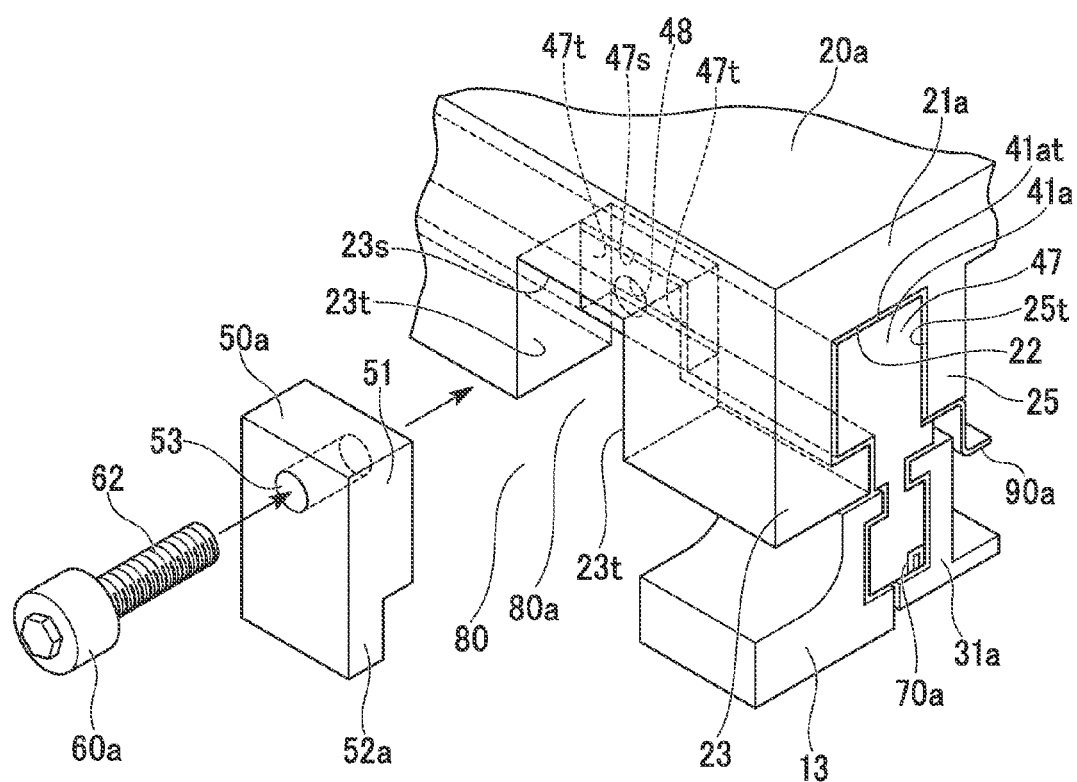
FIG. 10 is an exploded perspective view around the pressing member in the first embodiment related to the invention.

Next, an attachment structure around the first downstream attaching portion 21a (first downstream pressing member 50a) will be described with reference to FIGS. 4, 6, and 10.

A plurality of through grooves 23s through each of which the first downstream pressing member 50a is capable of being inserted in the axial direction are formed in the circumferential direction Dc in the upstream wall 23 arranged on the upstream side in the axial direction Da of the first downstream isolation segment 41a. The through groove 23s is formed as a pressing member space 80a which is sandwiched between the pair of circumferential opposite faces 23t of the upstream wall 23 to each other in the circumferential direction Dc, and the whole face thereof opens in the direction of the radially inward side Dri. The pressing member space 80a communicates with the space 80.

Additionally, as mentioned above, the pressing member groove 47s which the downstream end (isolation ring regulating portion 51) of the first downstream pressing member 50a in the axial direction Da enters toward the downstream side in the axial direction Da is formed at a position corresponding to the through groove 23s in the circumferential direction Dc and in the axial direction Da, in the upstream portion of the first downstream isolation segment 41a in the axial direction Da.

The attachment structure around the second upstream attaching portion 21b is also the sane as the structure of the first downstream attaching portion 21a. That is, as shown in FIGS. 4 and 7, the upstream wall 23 and the downstream wall 25 are formed adjacent to the second upstream isolation segment 41b in the axial direction Da, and the isolation ring groove 22 is formed between the upstream and downstream walls. The outer peripheral surface 41bt of the second upstream isolation segment 41b which is directed to the radially outward side Dro is fitted into the isolation ring groove 22 formed in the blade ring portion 20.

Additionally, a plurality of through grooves 23s through each of which the second upstream pressing member 50b is capable of being inserted in the axial direction Da are formed in the circumferential direction Dc in the upstream wall 23. The through groove 23s is formed as a pressing member space 80a which is sandwiched between the pair of circumferential opposite faces 23t of the upstream wall 23 to each other in the circumferential direction Dc, and the whole face thereof opens in the direction of the radially inward side Dri.

Additionally, the pressing member groove 47s which the downstream end (isolation ring regulating portion 51) of the second upstream pressing member 50b in the axial direction Da enters toward the downstream side in the axial direction Da is formed at a position corresponding to the through groove 23s in the circumferential direction Dc and in the axial direction Da, in the upstream portion of the second upstream isolation segment 41b.

The attachment structure around the second downstream attaching portion 21c is also the same as the structure of the first downstream attaching portion 21a and the second upstream attaching portion 21b. That is, as shown in FIGS. 5 and 8, the upstream wall 23 and the downstream wall 25 are formed adjacent to the second downstream isolation segment 41c in the axial direction Da and the outer peripheral surface 41ct of the second downstream isolation segment 41c which is directed to the radially outward side Dro is fitted into the isolation ring groove 22 formed in the blade ring portion 20.

Additionally, both the through groove 23s which is provided in the upstream wall 23 and through which the second downstream pressing member 50c is capable of being inserted in the axial direction Da and the pressing member groove 47s provided in the second downstream isolation segment 41c have also the same structure as the structure around the first downstream attaching portion 21a.

Additionally, in the first downstream attaching portion 21a, the second upstream attaching portion 21b, and the second downstream attaching portion 21c in the present embodiment, the pressing member is arranged on the upstream side in the axial direction Da and is fixed to the blade ring portion by bolt fastening in the axial direction Da with the isolation ring being sandwiched between the pressing member and the blade ring portion (downstream wall 25). The reason why the pressing member, the isolation ring, and the blade ring portion are arranged in this order from the upstream side toward the downstream side in the axial direction Da and these members are fixed to the blade ring portion in the axial direction is as follows. That is, since the sandwiched packing is attached in a state where the packing always holds a spring force, it is necessary to hold the isolation ring at a regular position so that the isolation ring does not move in the axial direction Da by the restoring force of the packing. This can always fix the position of the isolation ring during operation and stoppage, and can maintain stable operation of the gas turbine.

Additionally, in the present embodiment, the predetermined isolation rings are the first downstream isolation ring 40a, the second upstream isolation ring 40b, and the second downstream isolation ring 40c. Additionally, the upstream member with respect to the first downstream isolation ring 40a is the first vane stage 10a, and the downstream member is the first ring segment 30a. The upstream member with respect to the second upstream isolation ring 40b is the first ring segment 30a, and the downstream member is the second vane stage 10b. Additionally, the upstream member with respect to the second downstream isolation ring 40c is the second vane stage 10b, and the downstream member is the second ring segment 30b.

Next, the assembly procedure of the casing 4, particularly, the respective members to be attached to the inside of the blade ring portion 20 will be described.

First, as shown in FIGS. 3 and 4, the first downstream nut 65 (movement guide portion) as a portion of the blade ring portion 20 is installed into the through hole 26 of the first downstream attaching portion 21a of the blade ring portion 20.

Next, the second upstream isolation segment 41b which constitutes the second upstream isolation ring 40b which is the predetermined isolation ring is inserted into the isolation ring groove 22 in the second upstream attaching portion 21b of the blade ring portion 20 in the circumferential direction Dc. The second upstream pressing member 50b is attached in the axial direction Da via the space 80 and the through groove 23s on the upstream side of the second upstream isolation ring 40b. Next, the second upstream isolation segment 41b and the second upstream pressing member 50b are fixed in the axial direction Da with the second upstream bolt 60b. Moreover, the isolation ring regulating portion 51 of the second upstream pressing member 50b is attached to the pressing member groove 47s of the second upstream isolation segment 41b.

In addition, as described above, when the second upstream isolation segment 41b or the like is attached with the second upstream bolt 60b, the downstream projection 37 of the first split segment 31a is inserted into the first ring segment attachment groove 45b of the second upstream isolation segment 41b. Moreover, the first ring segment downstream packing 70b is inserted into the packing groove 43 of the second upstream isolation segment 41b in the circumferential direction Dc, and is simultaneously fixed with the second upstream bolt 60b. In the process of being fastened with the second upstream bolt 60b, the second upstream pressing member 50b presses the second upstream isolation segment 41b to the downstream side in the axial direction, the packing 70b is compressed in the axial direction Da, and the seating performance of the packing 70b is maintained.

Next, the first downstream isolation segment 41a to which the first ring segment upstream packing 70a is attached is inserted into the isolation ring groove 22 in the first downstream attaching portion 21a of the blade ring portion 20 in the circumferential direction Dc. The first downstream pressing member 50a is attached in the axial direction Da via the space 80 and the through groove 23s on the upstream side of the first downstream isolation ring 40a. Moreover, the first downstream isolation segment 41a and the first downstream pressing member 50a are fixed in the axial direction Da by the first downstream bolt 60a. At this time, the isolation ring regulating portion 51 of the first downstream pressing member 50a is put into the pressing member groove 47s of the first downstream isolation segment 41a.

Similarly to the second upstream attaching portion 21b, in the process of being fastened with the first downstream bolt 60a, the first downstream pressing member 50a presses the first downstream isolation segment 41a to the downstream side in the axial direction, the packing 70a is compressed in the axial direction Da, and the sealing performance of the packing 70a is maintained.

Next the first shield plate 90s is installed.

Next, as shown in FIGS. 3 and 5, the second downstream isolation segment 41c is inserted into the isolation ring groove 22 in the second downstream attaching portion 21c of the blade ring portion 20 in the circumferential direction Dc. The second downstream pressing member 50c is attached in the axial direction Da via the space 80 and the through groove 23s on the upstream side of the second downstream isolation ring 40c, and is fixed in the axial direction Da by the second downstream bolt 60c. Moreover, the isolation ring regulating portion 51 of the second downstream pressing member 50c is put into the pressing member groove 47s of the second downstream isolation segment 41c.

Next, as shown in FIGS. 3 to 5, the second vane 11b to which the second vane upstream packing 71b and the second vane downstream packing 71c are attached is installed between the second upstream isolation segment 41b and the second downstream isolation segment 41c in the circumferential direction Dc, and is fixed by the second downstream bolt 60c. In the process of being fastened with the second downstream bolt 60c, the second downstream pressing member 50c presses the second downstream isolation segment 41c to the downstream side in the axial direction, the packing 71c is compressed in the axial direction Da, and the sealing performance of the packing 70c is maintained.

Next, the third pressing member 50d is installed into the upstream side of the third attaching portion 21d of the blade ring portion 20.

Next, the second shield plate 90b is installed.

Next, the upstream projection 35 of the second split segment 31b is inserted into the second ring segment attachment groove 45c of the second downstream isolation segment 41c, and the second ring segment upstream packing 70c is pushed into the packing groove 43 of the second downstream isolation ring 40c in the axial direction Da. Subsequently, the third isolation segment 41d to which the second ring segment downstream packing 70d is attached is installed from the downstream side of the third attaching portion 21d in the axial direction Da. Moreover, the third bolt 60d is inserted in the axial direction Da to fix the second split segment 31b, the third isolation segment 41d, and the third pressing member 50d. Thereby, in the process of being fastened with the third bolt 60d, the third isolation segment 41d and the second split segment 31b are pushed to the upstream side in the axial direction, the packings 70c and 70d are compressed, and the sealing performance of the packings 70c and 70d is maintained.

As described above, in the present embodiment, the first blade ring portion 20a to which the first vanes 11a are attached, and the second blade ring portion 20b to which the second vanes 11b are attached form the integrally formed blade ring portion 20. Thus, high accurate clearance control of the overall integrated blade ring is possible, and the performance of the turbine is further improved.

Additionally, in the present embodiment, in the process of assembling the first ring segment 30a arranged in the vicinity of the center of the blade ring portion 20 in the axial direction Da, the first ring segment 30a or the like can be fixed to the blade ring portion 20 while compressing the packing, which is to be applied to the first ring segment 30a or the like, in the axial direction Da. This is because, when the first split segment 31a or the like is attached to the blade ring portion 20, a pressing member 50 is arranged on the upstream side of a predetermined isolation ring 40 for each predetermined isolation ring 40 so that the pressing member 50 is pressed to the downstream side by the bolt 60.

Second Embodiment

Next, a gas turbine as a second embodiment related to the invention will be described with reference to FIGS. 11 to 18.

The configuration of the gas turbine of the present embodiment is different from the configuration of the blade ring portion 20 (integrated blade ring 20x) and the various attachment parts to the blade ring portion 20 in the first embodiment, but otherwise the configuration thereof is basically the same as that of the first embodiment. Thus, the blade ring portion 20 (integrated blade ring 20y) and the various attachment parts to the blade ring portion 20 (integrated blade ring 20y) of the present embodiment will be described below.

As shown in FIG. 11, similarly to the first embodiment, the plurality of first vanes 11a which constitute the first vane stage 10a, the plurality of second vanes 11b which constitute the second vane stage 10b, the first ring segment 30a which is arranged between the first vane stage 10a and the second vane stage 10b, and the second ring segment 30b which is arranged on the downstream side of the second vane stage 10b are attached to the blade ring portion 20 of the present embodiment. Moreover, similarly to the first embodiment, the fixing block 49, a first downstream isolation ring 40f, a second upstream isolation ring 40g, a second downstream isolation ring 40h, and a third isolation ring 40i are attached to the blade ring portion 20. That is, the fixing block 49 is a member for attaching the upstream portions of the outer shrouds 13 of the first vanes 11a to the blade ring portion 20. The first downstream isolation ring 40f is a member for attaching the downstream portions of the outer shrouds 13 of the first vanes 11a and the upstream portion of the first ring segment 30a to the blade ring portion 20. The second upstream isolation ring 40g is a member for attaching the first downstream isolation ring 40f, the downstream portion of the first ring segment 30a, and the upstream portions of the outer shrouds 13 of the second vanes 11b to the blade ring portion 20. The second downstream isolation ring 40h is a member for attaching the downstream portions of the outer shrouds 13 of the second vanes 11b, and the upstream portion of the second ring segment 30b to the blade ring portion 20. The third isolation ring 40i is a member for attaching the downstream portion of the second ring segment 30b to the blade ring portion 20.

In the present embodiment, pressing members 50f and 50g which press the isolation rings 40f and 40g to the downstream side, and bolts 60f and 60g as tools for fixing these pressing members to the blade ring portion 20 are used for the attachment of the first downstream isolation ring 40f and the second upstream isolation ring 40g to the blade ring portion 20.

Similarly to the first embodiment, a first upstream attaching portion 21j to which the fixing block 49 for the first vanes 11a is attached and a first downstream attaching portion 21f to which the first downstream isolation ring 40f and the first downstream pressing member 50f are attached are formed on the inner peripheral side of the first blade ring portion 20f of the blade ring portion 20. Additionally, a second upstream attaching portion 21g to which the second upstream isolation ring 40g and the second upstream pressing member 50g are attached, a second downstream attaching portion 21h to which the second downstream isolation ring 40h is attached, a third attaching portion 21i to which the third isolation ring 40i is attached are formed on the inner peripheral side of the second blade ring portion 20g of the blade ring portion 20. Additionally, similarly to the first embodiment, the respective attaching portions are lined up in order of the first upstream attaching portion 21j, the first downstream attaching portion 21f, the second upstream attaching portion 21g, the second downstream attaching portion 21h, and the third attaching portion 21i from the upstream side toward the downstream side.

Figure 12:
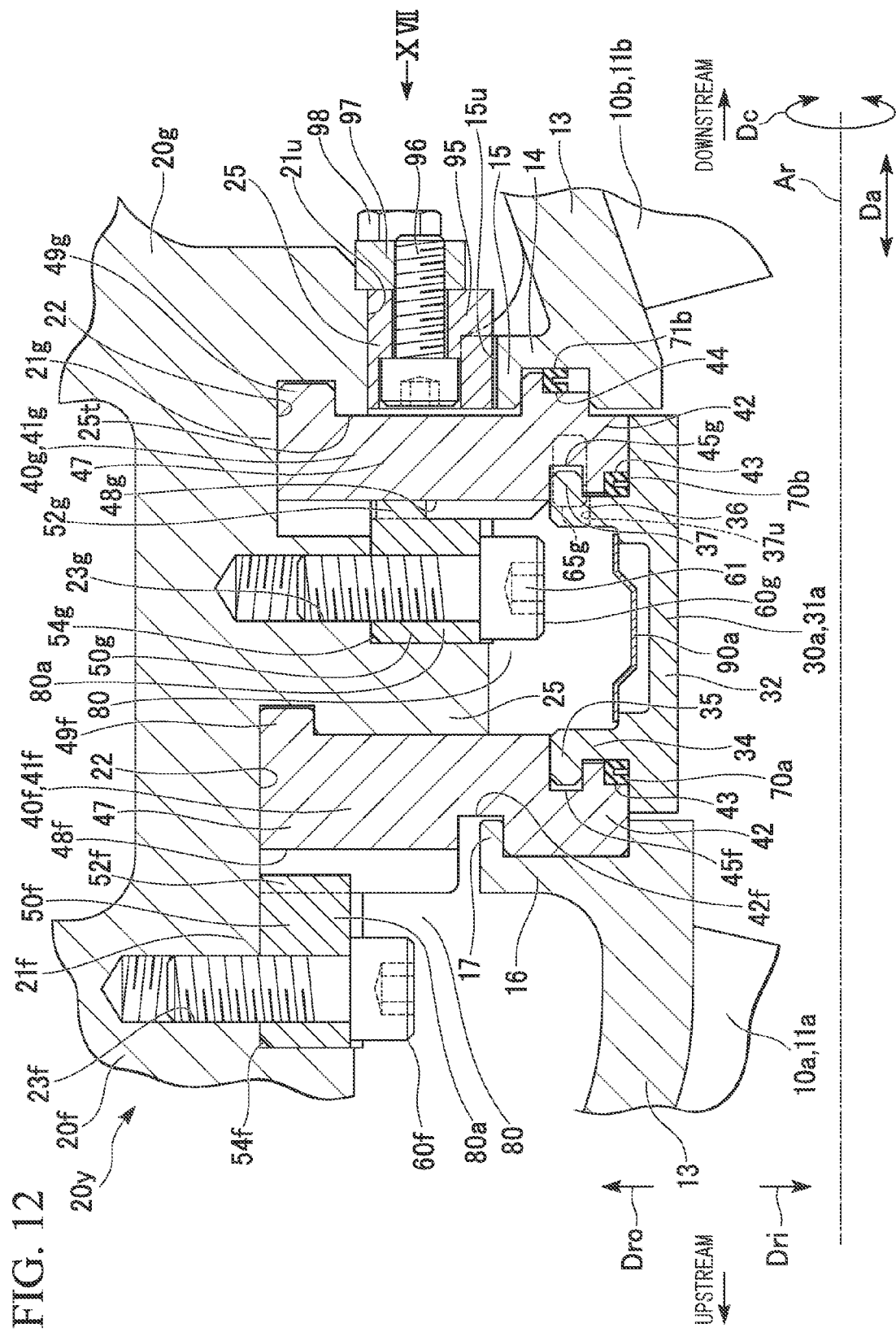
FIG. 12 is an enlarged view of section XII in FIG. 11.
Figure 13:
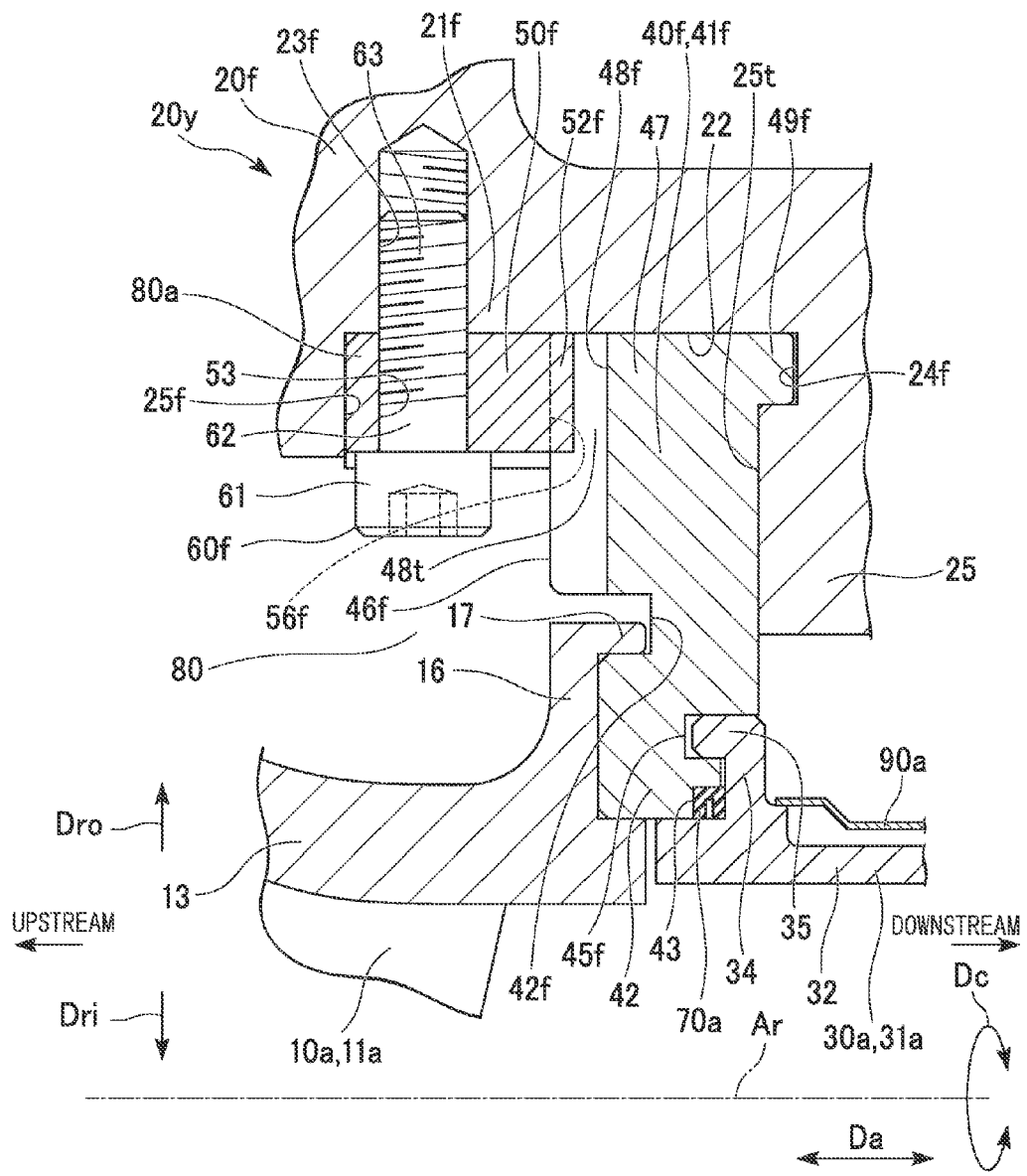
FIG. 13 is an enlarged view around a first downstream attaching portion that is a left portion in FIG. 12.
Figure 14:
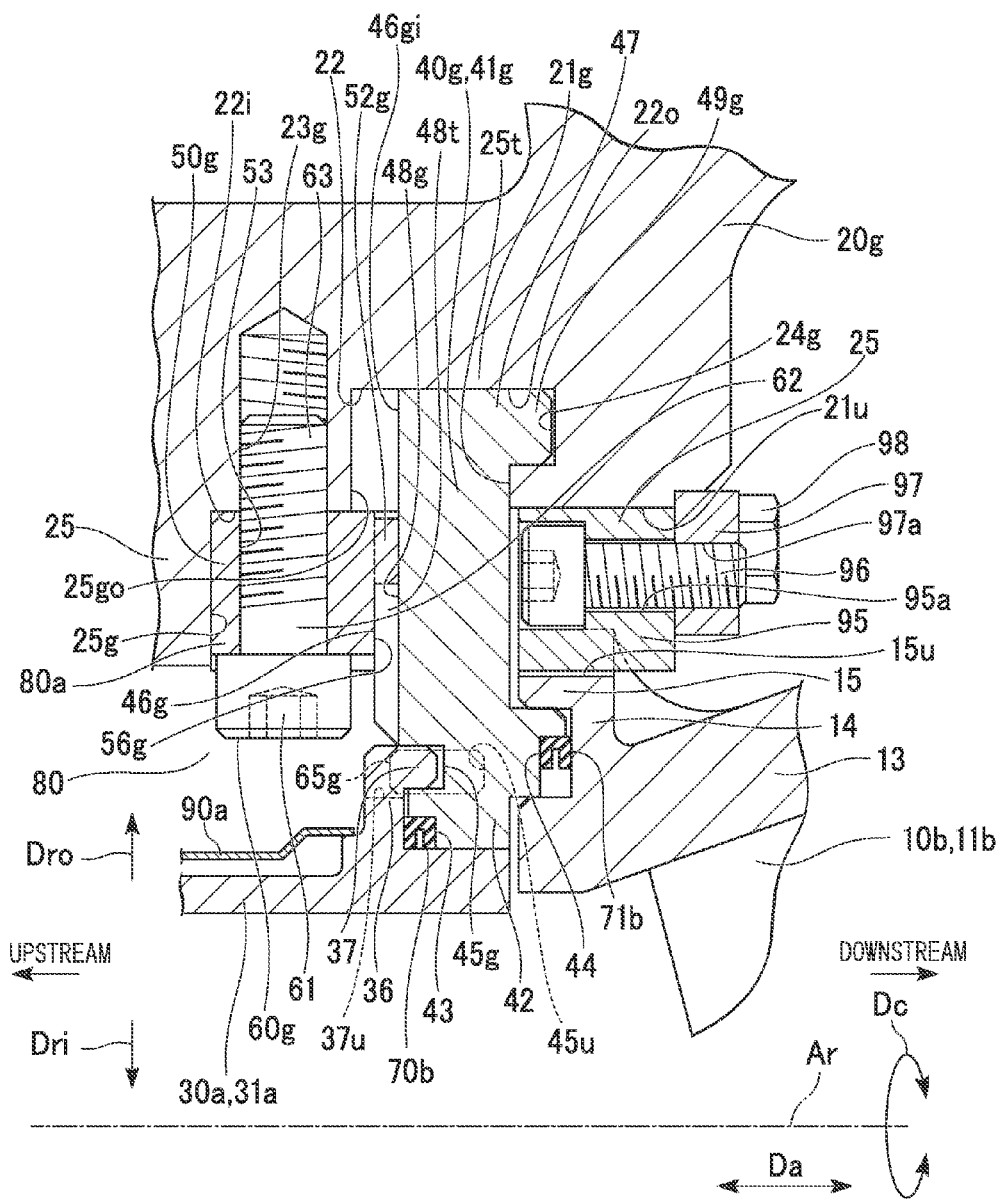
FIG. 14 is an enlarged view around a second upstream attaching portion that is a right portion in FIG. 12.

In addition, as shown in FIGS. 12 to 14, as for the first downstream attaching portion 21f and the second upstream attaching portion 21g, the isolation ring groove 22 is formed to be recessed from the inner peripheral side of the blade ring portion 20 toward the radially outward side Dm. Each isolation ring is arranged so that the outer peripheral surface which is directed to the radially outward side Dro abuts against the isolation ring groove 22 from the radially inward side Dri. Additionally, the convex downstream wall 25 of the blade ring portion 20 which extends further toward the radially inward side from the outer peripheral surface of each isolation ring is formed on the downstream side in the axial direction Da adjacent to each isolation ring.

Additionally, the annular space 80 is formed between the inner peripheral side of the blade ring portion 20 and the outer peripheral surface of a vane stage or a ring segment in the radial direction. The annular pressing member space 80a is formed between an upstream face 25f of the isolation ring groove 22 and the attached portion 47 of the isolation ring arranged on the downstream side in the axial direction Da, and communicates with the space 80. The pressing member is inserted into the pressing member space 80a via the space 80 from the radially inward side Dri, and is fixed to the blade ring portion 20 from the radially inward side Dri.

Thereby, a structure is formed in which the pressing member, the isolation ring, and the downstream wall are arranged in this order from the upstream side toward the downstream side in the axial direction Da, and the isolation ring is sandwiched between the pressing member and the downstream wall in the axial direction with the isolation ring therebetween.

Figure 18:
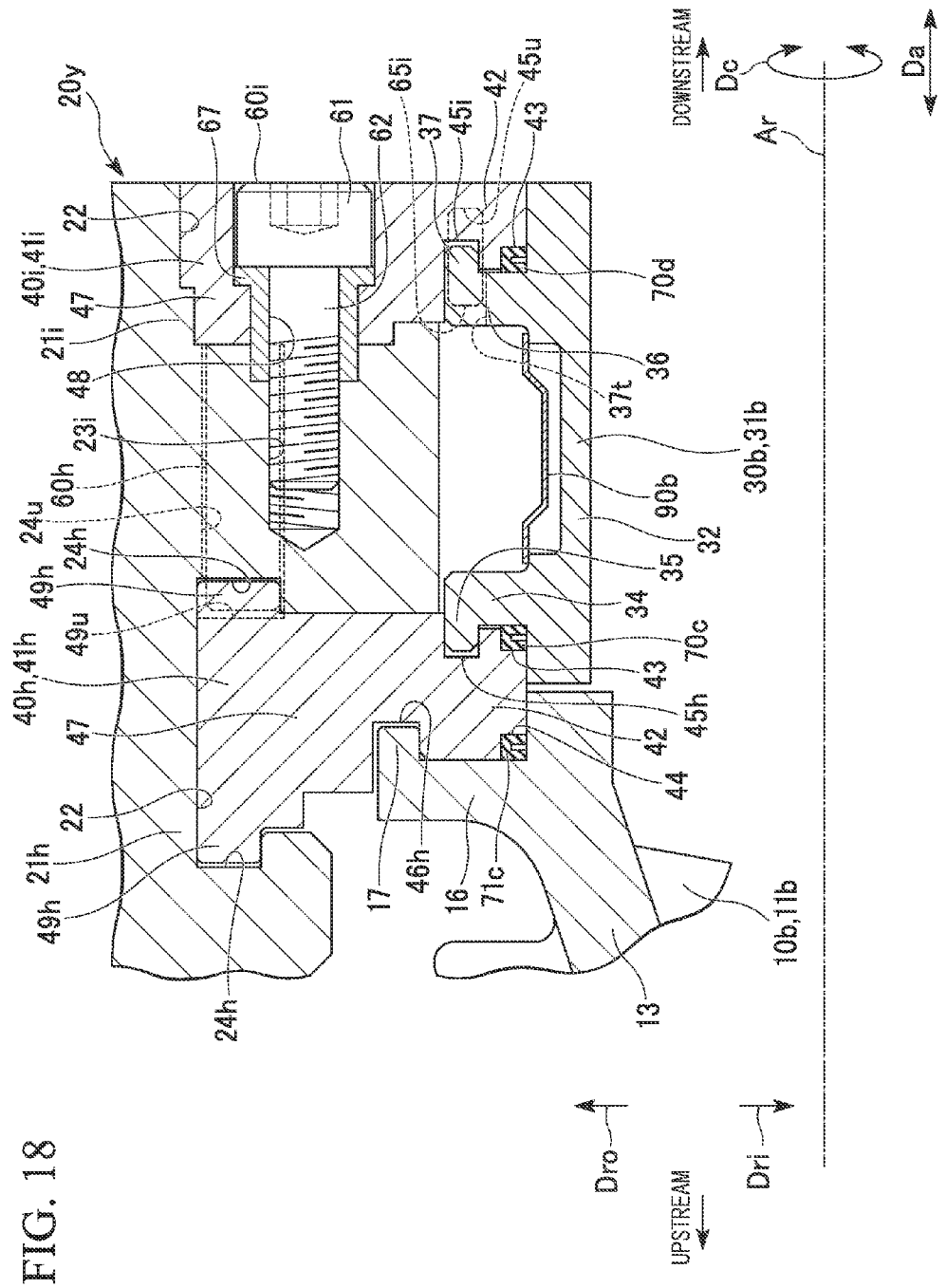
FIG. 18 is a view as seen from arrow XVIII in FIG. 11.

Similarly to the first embodiment, the first ring segment 30a and the second ring segment 30b are configured to have a plurality of split segments 31a and 31b. Additionally, as shown in FIGS. 12 and 18, each of the split segments 31a and 31b also has the split segment body 32 which spreads in the circumferential direction Dc, the upstream leg 34 which extends from the upstream portion of the split segment body 32 to the radially outward side Dro, and the downstream leg 36 which extends from the downstream portion of the split segment body 32 to the radially outward side Dro. An upstream projection 35 which protrudes toward the upstream side is formed at a radially outward side end of the upstream leg 34. Additionally, a downstream projection 37 which protrudes, toward the downstream side is formed at the radially outward side end of the downstream leg 36.

Pin grooves 37u which penetrate from the upstream side to the downstream side are respectively formed in the downstream projection 37 in each of the plurality of both first split segments 31a constitute the first ring segment 30a, and second split segments 31b which constitute the second ring segment 30b. Additionally, the upstream projection 15 in each of the plurality of second vanes 11b which constitute the second vane stage 10b is provided with, a regulating member groove 15u which penetrates from the downstream side to the upstream side.

Additionally, the isolation rings 40f, 40g, 40h, and 40i are also configured to have a plurality of isolation segments 41f, 41g, 41h, and 41i, respectively, similarly to the first embodiment. Each of the isolation segments 41f, 41g, 41h, and 41i has the inside ring attaching portion 42 to which the vane 11 and/or the split segment 31 are attached, and the attached portion 47 which is located on the radially outward side Dro with respect to the inside ring attaching portion 42, and is attached to the blade ring portion 20.

Figure 15:
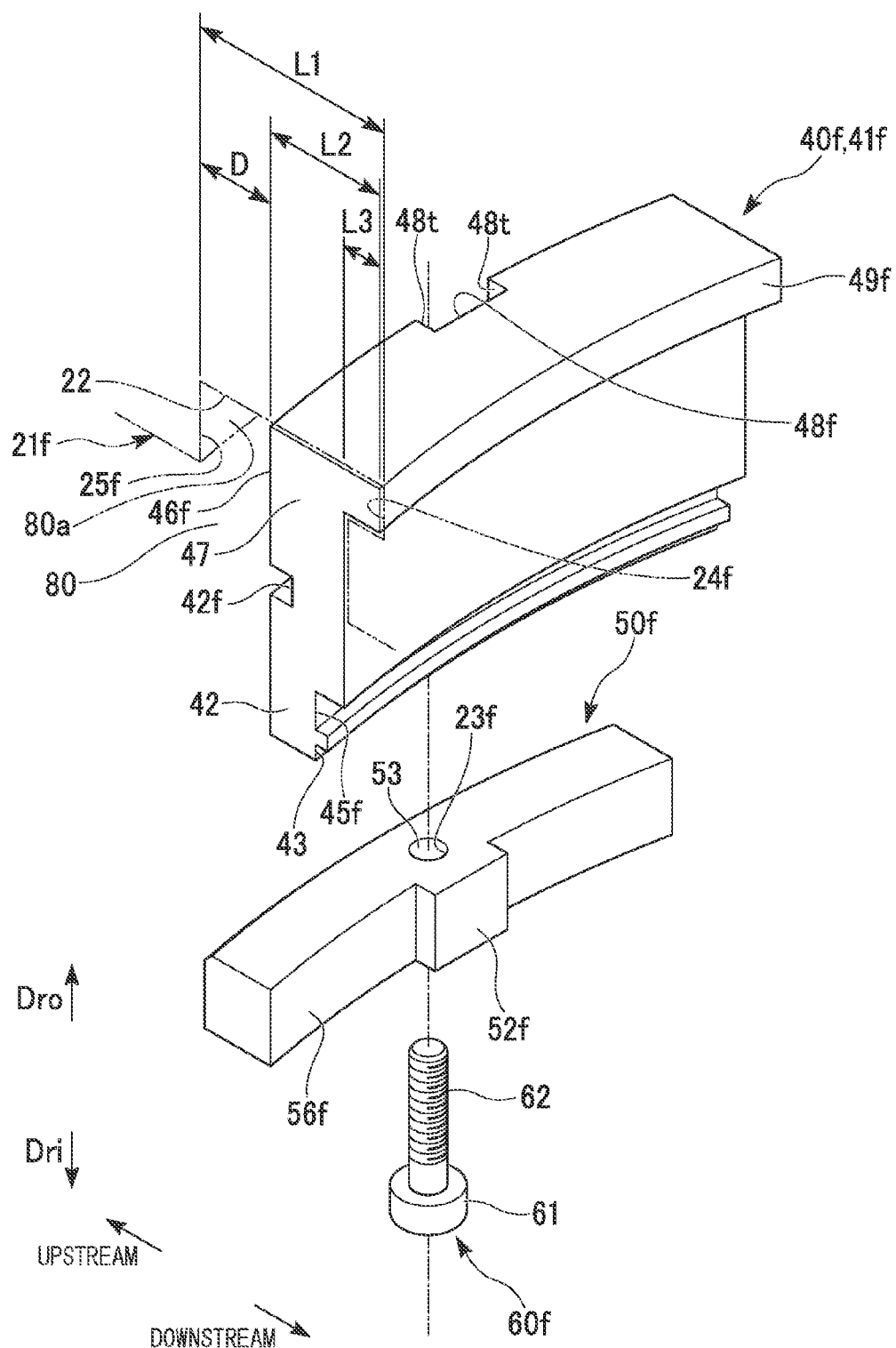
FIG. 15 is an exploded perspective view of a first downstream pressing member and a first downstream isolation segment in the second embodiment related to the invention.

As shown in FIGS. 12, 13, and 15, the inside ring attaching portion 42 of each of the plurality of first downstream isolation segments 41f which constitute the first downstream isolation ring 40f is provided with a first vane attachment groove 42f which is recessed from the upstream side to the downstream side and winch the downstream projection 17 of the first vane 11a enters. Moreover, the inside ring attaching portion 42 of the first downstream isolation segment 41f is provided with a first ring segment attachment groove 45f which is recessed from the downstream side to the upstream side and which the upstream projection 35 of the first split segment 31a enters, and the packing groove 43 which is recessed from the downstream side to the upstream side and which the first ring segment upstream packing 70a enters. Additionally, the attached portion 47 of the first downstream isolation segment 41f is provided with a guide groove portion 48f which is recessed from the upstream side toward the downstream side, which extends in the radial direction Dr, and which a portion of the first downstream pressing member 50f enters and is slidable in the radial direction Dr. The guide groove portion 48f is provided with a pair of circumferential opposite faces 48t (FIG. 15) to each other in the circumferential direction Dc. Moreover, the attached portion 47 is provided with a top projection 49f which protrudes toward the downstream side, and regulates the position of the first downstream isolation segment 41f in the radial direction Dr with respect to the blade ring portion 20.

Figure 16:
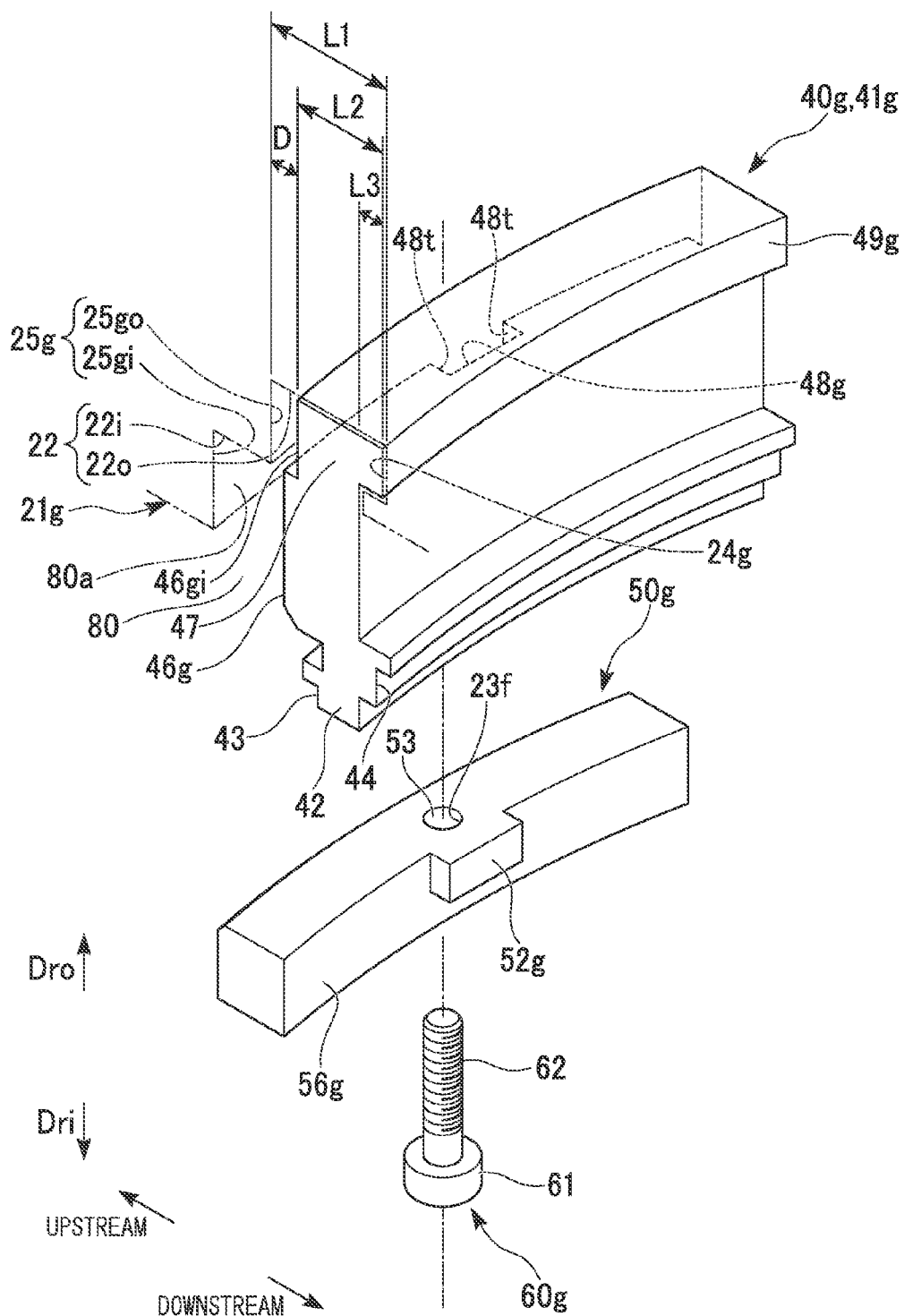
FIG. 16 is an exploded perspective view of a second downstream pressing member and a second downstream isolation segment in the second embodiment related to the invention.

As shown in FIGS. 12, 14 and 16, the radially inward side ring attaching portion 42 of each of the plurality of second upstream isolation segments 41g which constitute the second upstream isolation ring 40g is provided with a first ring segment attachment groove 45g which is recessed from the upstream side to the downstream side and which the downstream projection 37 of the first split segment 31a enters. Additionally, the packing groove 43 which is recessed from the upstream side to the downstream side and which the first ring segment downstream packing 70b enters is formed. Moreover, the inside ring attaching portion 42 of the second upstream isolation segment 41g is provided with the packing groove 44 which is recessed from the downstream side to the upstream side and which the second vane upstream packing 71b enters. A portion of the first ring segment attachment groove 45g in the circumferential direction Dc is provided with a pin hole 45u (FIG. 14) which is recessed from the groove bottom of the first ring segment attachment groove 45g to the downstream side. Additionally, similarly to the first downstream isolation segment 41f, the attached portion 47 of the second upstream isolation segment 41g is provided with a guide groove portion 48g which is recessed from the upstream side toward the downstream side, which extends in the radial direction Dr, and which a portion of the second upstream pressing member 50g enters and is slidable in the radial direction Dr. The guide groove portion 48g is provided with a pair of circumferential opposite faces 48t (FIG. 16) to each other in the circumferential direction Dc. Moreover the attached portion 47 is provided with a top projection 49g which protrudes toward the downstream side, and regulates the position of the second upstream isolation segment 41g in the radial direction Dr with respect to the blade ring portion 20.

As shown in FIG. 18, the inside ring attaching portion 42 of each of the plurality of second downstream isolation segments 41h which constitute the second downstream isolation ring 40h is provided with a second vane attachment groove 46h which is recessed from the upstream side to the downstream side and which the downstream projection 17 of the second vane 11b enters, and the packing groove 44 which is recessed from the upstream side to the downstream side and which the second vane downstream packing 71c enters. Moreover, the inside ring attaching portion 42 of the second downstream isolation segment 41h is provided with a second ring segment attachment groove 45h which is recessed from the downstream side to the upstream side and which the upstream projection 35 of the second split segment 31b enters, and the packing groove 43 which is recessed from the downstream side to the upstream side and which the second ring segment upstream packing 70c enters. Additionally, a projection 49h which protrudes from the upstream side toward the downstream side is formed on the upstream side of the attached portion 47 of the second downstream isolation segment 41h, and a projection 49h which protrudes from the downstream side toward the upstream side is formed on the downstream side of the attached portion 47. Both of these projections 49h regulate the position of the second downstream isolation segment 41h in the radial direction Dr with respect to the blade ring portion 20. Additionally, the projection 49h which is provided on the downstream side of the attached portion 47 and which protrudes from the downstream side toward the upstream side is provided with a pin groove 49u which is recessed from the downstream side toward the upstream side.

The inside ring attaching portion 42 of each of the plurality of third isolation segments 41i which constitute the third isolation ring 40i is provided with a second ring segment attachment groove 45i which is recessed from the upstream side to the downstream side and which the downstream projection 37 of the second split segment 31b enters, and the packing groove 43 which is recessed from the upstream side to the downstream side and which the second ring segment downstream packing 70d enters. A portion of the second ring segment attachment groove 45i in the circumferential direction is provided with the pin hole 45u which is recessed from the groove bottom of the second ring segment attachment groove 45i to the downstream side. Additionally, the attached portion 47 of the third isolation segment 41i is provided with the through hole 48 which passes through the third isolation segment 41i in the axial direction Da and through which the shank 62 of a third bolt 60i and a sleeve 67 mounted on the shank 62 are inserted.

As shown in FIGS. 13 and 15, the first downstream pressing member 50f is provided with a guide projection portion 52f which is recessed from the downstream side to the upstream side and enters the guide groove portion 48f of the first downstream isolation segment 41f, and the through hole 53 which passes through the first downstream pressing member 50f in the radial direction Dr and through which the shank 62 of the first downstream bolt 60f is capable of being inserted.

As shown in FIGS. 14 and 16, similarly to the first downstream pressing member 50f, the second upstream pressing member 50g is provided with a guide projection portion 52g which is recessed from the downstream side to the upstream side and enters the guide groove portion 48g of the second upstream isolation segment 41g, and the through hole 53 which passes through the second upstream pressing member 50g in the radial direction Dr and through which the shank 62 of the second upstream bolt 60g is capable of being inserted.

As shown in FIGS. 13 and 15, the first downstream attaching portion 21f of the blade ring portion 20 is provided with the isolation ring groove 22 which is recessed from the radially inward side Dri toward the radially outward side Dro and which the first downstream pressing member 50f and the attached portion 47 of the first downstream isolation segment 41f enter. Additionally, the first downstream attaching portion 21f is provided with a female thread hole 23f which extends from the groove bottom of the isolation ring groove 22 toward the radially outward side Dro and into which a male thread 63 of the first downstream bolt 60f is capable of being screwed. Moreover, the first downstream attaching portion 21f is provided with a side wall groove 24f which is recessed from the downstream wall of the isolation ring groove 22 toward the downstream side, and which the top projection 49f of the first downstream isolation segment 41f enters. In addition, an inclined face which is gradually directed to the downstream side as it goes toward the radially outward side Dro may be formed in the upstream face 25f of the isolation ring groove 22 as a movement guide portion of the first downstream pressing member 50f.

Here, a downstream face 56f of the first downstream pressing member 50f and an upstream face 46f of the attached portion 47 of the first downstream isolation segment 41f come into contact with each other. The first downstream pressing member 50f is fixed to the first downstream attaching portion 21f with the bolt 60f screwed into the female thread hole 23f while pressing the attached portion 47 of the first downstream isolation segment 41f to the downstream side via this contact surface. Thereby a structure is formed in which the first downstream pressing member 50f, the first downstream isolation segment 41f, and the downstream wall 25 are arranged in this order from the upstream side toward the downstream side in the axial direction Da, and the first downstream isolation segment 41f is sandwiched by the first downstream pressing member 50f and the downstream wall 25 in the axial direction Da. As a result, the first downstream pressing member 50f presses the first downstream isolation segment 41f to the downstream side in the axial direction Da, the attached portion 47 of the first downstream isolation segment 41f is pressed to the downstream side in the axial direction Da, the packing 70a arranged in the packing groove 43 is compressed in the axial direction Da, and the sealing performance of the packing 70a is maintained.

Additionally, as shown in FIG. 15, in order to make the attached portion 47 of the first downstream isolation segment 41f and the top projection 49f attachable to and detachable from the isolation ring groove 22 and the side wall groove 24f in the radial direction Dr and the axial direction Da, the gap D in tire axial direction Da between the upstream face 46f of the attached portion 47 and the upstream face 25f of the isolation ring groove 22 is required to be greater than the protruding length (L3) of the top projection 49f in the axial direction. In other words, the thickness (L2) of a top on the radially outward side of the attached portion 47 in the axial direction is required to be smaller than at least a groove width obtained by subtracting the axial protruding length (L3) of the top projection 49f from the maximum groove width (L1) of the isolation ring groove 22 in the axial direction Da. If such a shape is selected, it is possible to insert the first downstream isolation segment 41f (attached portion 47) into the isolation ring groove 22 via the space 80 and the pressing member space 80a from the radially inward side Dri, and further move the first downstream isolation segment to the downstream side in the axial direction, and to insert the top projection 49f into the side wall groove 24f from the axial direction Da, and attachment and detachment of the first downstream isolation segment 41f in the axial direction Da becomes possible. Additionally, on the other hand, in the case of disassembly, it is also possible to remove the first downstream isolation segment 41f from the axial direction Da. In addition, it is desirable that the width of the pressing member space 80a in the axial direction Da be greater than at least the gap D.

As shown in FIGS. 14 and 16, the second upstream attaching portion 21g of the blade ring portion 20 is provided with the isolation ring groove 22 which is recessed from the radially inward side Dri toward the radially outward side Dro and which the second upstream pressing member 50g and the attached portion 47 of the second upstream isolation segment 41g enter. Additionally, the second upstream attaching portion 21g is provided with a female thread hole 23g which extends from the groove bottom of the isolation ring groove 22 toward the radially outward side Dro and into which a male thread 63 of the second upstream bolt 60g is capable of being screwed. Moreover, the second upstream attaching portion 21g is provided with a side wall groove 24g which is recessed from the downstream wall of the isolation ring groove 22 toward the downstream side, and which the top projection 49g of the second upstream isolation segment 41g enters. In addition, an inclined face which is gradually directed to the downstream side as it goes toward the radially outward side Dro may be formed in the upstream face 25g of the isolation ring groove 22 as a movement guide portion of the second upstream pressing member 50g.

Here, the isolation ring groove 22 of the second upstream isolation ring 40g is formed by grooves 22o and 22i cut in two steps in the radial direction Dr. The outside isolation ring groove 22o is arranged on the outside in the radial direction Dr, and the radially outward side face of the attached portion 47 of the second upstream isolation segment 41g comes into contact with the bottom face of the outside isolation ring groove 22o. Additionally the inside isolation ring groove 22i is formed adjacent to the upstream side of the outside isolation ring groove 22o radially inside the outside isolation ring groove 22o. The above-described through hole 53 is formed in the radial direction in the inner peripheral surface of the inside isolation ring groove 22i in the radial direction. An upstream face 25gi of the inside isolation ring groove 22i forms the aforementioned upstream face 25g of the isolation ring groove 22 together with an upstream face 25go of the aforementioned outside isolation ring groove 22o. In addition, the isolation ring groove 22 of the second upstream isolation ring 40g may be formed not by the groove formed in two steps but by one groove which is widened in the axial direction Da similarly to the isolation ring groove 22 of the first downstream isolation ring 40f.

Similarly to the first downstream pressing member 50f, even in the second upstream pressing member 30g, a downstream face 56g of the second upstream pressing member 50g and an upstream face 46g of the second upstream isolation segment 41g come into contact with each other. The second upstream pressing member 50g is fixed to the second upstream attaching portion 21g with the bolt 60g screwed into the female thread hole 23g while pressing the attached portion 47 of the second upstream isolation segment 41g to the downstream side via this contact surface. Thereby, the first downstream attaching portion 21f has a structure in which the first downstream pressing member 50f, the first downstream isolation segment 41f, and the downstream wall 25 are arranged in this order from the upstream side toward the downstream side in the axial direction Da, and the first downstream pressing member 50f and the downstream wall 25 are arranged on the upstream side and the downstream side, respectively, so as to sandwich the first downstream isolation segment 41f in the axial direction Da. Additionally, the second upstream attaching portion 21g also similarly has a structure in which the second upstream pressing member 50g, the second upstream isolation segment 41g, and the downstream wall 25 are arranged in this order, and the second upstream pressing member 50g and the downstream wall 25 are arranged on the upstream side and the downstream side, respectively, so as to sandwich the second upstream isolation segment 41g in the axial direction Da. As a result, the first downstream pressing member 50f presses the first downstream isolation segment 41f to the downstream side in the axial direction Da, the attached portion 47 of the second upstream isolation segment 41g is pushed to the downstream side in the axial direction Da the packing 71b arranged in the packing groove 44 is compressed in the axial direction Da, and the sealing performance of the packing 71b is maintained.

Additionally, as shown in FIG. 16, in order to make the attached portion 47 of the second upstream isolation segment 41g and the top projection 49g attachable to and detachable in the outside isolation ring groove 22o and the side wall groove 24g in the radial direction Dr and the axial direction Da, the gap D between an upstream face 46gi of the attached portion 47 and the radially outward side upstream face 25go of the outside isolation ring groove 22o is required to be greater than the protruding length (L3) of the top projection 49g in the axial direction. In other words, the thickness (L2) of a top on the radially outward side of the attached portion 47 in the axial direction Da is required to be smaller than at least a groove width obtained by subtracting the axial protruding length (L3) of the top projection 49g from the maximum groove width (L1) of the outside isolation ring groove 22o in the axial direction Da. If such a shape is selected, it is possible to insert the attached portion 47 into the outside isolation ring groove 22o from the radially inward side, and to insert the top projection 49g into the side wall groove 24g in the axial direction Da. Additionally on the other hand, in the case of removal, it is also possible to remove the attached portion 47 of the second upstream isolation segment 41g in the axial direction Da. In addition, in a case where the isolation ring groove 22 is formed not by the groove cut in two steps in the radial direction Dr but by one groove which is widened in the axial direction Da similarly to the first downstream isolation ring 40f, in the above description, the outside isolation ring groove 22o can be substituted with the isolation ring groove 22.

Figure 17:
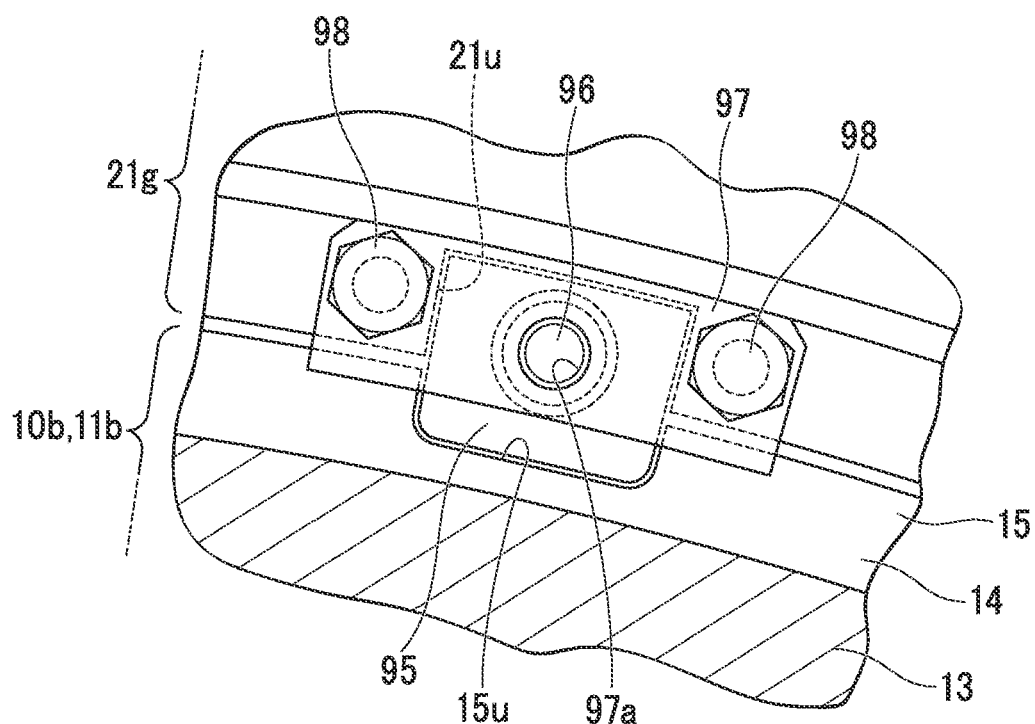
FIG. 17 is a view as seen from arrow XVII in FIG. 12.

Moreover, as shown in FIGS. 14 and 17, a regulating member groove (recess) 21u which penetrates from the downstream side to the upstream side is formed at the same position as the regulating member groove (recess) 15u of the second vane 11b in the circumferential direction Dc and the axial direction Da in the second upstream attaching portion 21g. A circumferential regulating member 95 enters the regulating member groove 15u of the second vane 11b and the regulating member groove 21u of the second upstream attaching portion 21g. A regulating member receiving plate 97 which blocks a downstream opening in the regulating member groove 21u is fixed to the second upstream attaching portion 21g with a bolt 96.

As shown in FIG. 18, the second downstream attaching portion 21h of the blade ring portion 20 is provided with the isolation ring groove 22 which is recessed from the radially inward side Dri toward the radially outward side Dro and which the attached portion 47 of the second downstream isolation segment 41h enters. Upstream and downstream walls of the isolation ring groove 22 are provided with side wall grooves 24b which projections of the second downstream isolation segment 41h enter.

The third attaching portion 21i of the blade ring portion 20 is provided with the isolation ring groove 22 which is recessed toward the radially outward side Dro and the upstream side and which the attached portion 47 of the third isolation segment 41i enters. The upstream wall of the isolation ring groove 22 is provided with a female thread hole 23i which is recessed from this upstream wall toward the upstream side and into which the male thread 63 of the third bolt 60d is capable of being screwed. Moreover, the upstream wall of the isolation ring groove 22 is provided with a pin hole 24u which penetrates to the isolation ring groove 22 of the second downstream attaching portion 21h.

In addition, in the present embodiment, the predetermined isolation rings are the first downstream isolation ring 40f and the second upstream isolation ring 40g. Additionally, the upstream member with respect to the first downstream isolation ring 40f is the first vane stage 10a, and the downstream member is the first ring segment 30a. Additionally, the upstream member with respect to the second upstream isolation ring 40g is the first ring segment 30a, and the downstream member is the second vane stage 10b.

Next, the assembly procedure of the casing 4, particularly, the respective members to be attached to the inside of tire blade ring portion 20, will be described.

First, as shown in FIG. 18, the attached portion 47 of the second downstream isolation segment 41h is inserted into the isolation ring groove 22 in the second downstream attaching portion 21h of the blade ring portion 20 from the circumferential direction Dc. Then, the pin (circumferential regulating member) 60b is put into the pin hole 24u which penetrates from the upstream wall 23 of the isolation ring groove 22 of the third attaching portion 21i to the isolation ring groove 22 of the second downstream attaching portion 21h in the downstream side, and the upstream end of the pin 60h is inserted into the pin groove 49u of the second downstream isolation segment. As a result, the movement of the second downstream isolation segment 41h in the circumferential direction Dc is constrained by the pin 60h.

Next, the upstream projection 35 of the second split segment 31b is inserted into the second ring segment attachment groove 45h of the second downstream isolation segment 41h, and the second ring segment upstream packing 70c is inserted into the packing groove 43 of the second downstream isolation segment 41h in the axial direction Da.

Next, the third isolation segment 41i to which the second ring segment downstream packing 70d is attached is inserted into the isolation ring groove 22 in the third attaching portion 21i of the blade ring portion 20.

Next, a pin (circumferential regulating member) 65i is inserted into the pin groove (recess) 37u of the second split segment 31b and the pin hole (recess) 45u of the third isolation segment 41i from the upstream side of these, and movement of the second split segment 31b in the circumferential direction Dc with respect to the third isolation segment 41i is constrained.

Subsequently, the third bolt 60i on which the sleeve 67 is mounted is inserted through the through hole 48 of the third isolation segment 41i and is screwed into the female thread hole 23i of the third attaching portion 21i, and the third isolation segment 41i is fixed to the third attaching portion 21i.

Next, the downstream projection 17 of the second vane 11b is inserted into the second vane attachment groove 46h of the second downstream isolation segment 41h, and the second vane downstream packing 71c is inserted into the packing groove 44 of the second downstream isolation segment 41h in the axial direction Da.

Next, as shown in FIGS. 14 and 17, the regulating member receiving plate 97 is fixed to the second upstream attaching portion 21g with a bolt 98. Subsequently, the circumferential regulating member 95 is put into the regulating member groove (recess) 15u of the second vane 11b and the regulating member groove (recess) 21u of the second upstream attaching portion 21g from the upstream side. Then, the bolt 96 is screwed into a female thread 97a of the regulating member receiving plate 97 through a through hole 95a of the circumferential regulating member 95, and the circumferential regulating member 95 is fixed.

Next, the second upstream pressing member 50g is inserted into the isolation ring groove 22 of the second upstream attaching portion 21g from the radially inward side, and the second upstream pressing member 50g is fixed to the second upstream attaching portion 21g with the second upstream bolt 60g while making the second upstream isolation segment 41g abut against the downstream side in the axial direction. In this case, the guide projection portion 52g of the second upstream pressing member 50g is inserted into the guide groove portion 48g of the second upstream isolation segment 41g. Then, the shank 62 of the second upstream bolt 60g is inserted through the through hole 53 of the second upstream pressing member 50g and is screwed into the female thread hole 23g formed in the groove bottom of the isolation ring groove 22, and the second upstream pressing member 50g is fixed from the radially outward side Dro.

In the process in which the second upstream isolation segment 41g is pushed to the downstream side, the second vane upstream packing 71b is compressed in the axial direction Da and the second upstream isolation segment 41g and the second vane 11b are sealed therebetween. Moreover, the second vane 11b is pushed to the downstream side by the second upstream isolation segment 41g, and the second vane downstream packing 71c (FIG. 18) is compressed in the axial direction Da, and the second vane 11b and the second downstream isolation segment 41h are sealed therebetween.

Next, the downstream projection 37 of the first split segment 31a is inserted into the first ring segment attachment groove 45g of the second upstream isolation segment 41g, and the first ring segment downstream packing 70b is inserted into the packing groove 43 of the second upstream isolation segment 41g.

Next, a pin (circumferential regulating member) 65g is inserted into the pin groove (recess) 37u of the first split segment 31a and the pin hole (recess) 45u of the second upstream isolation segment 41g from the upstream side of these, and movement of the first split segment 31a in the circumferential direction Dc with respect to the second upstream isolation segment 41g is constrained.

Next, as shown in FIG. 13, the attached portion 47 of the first downstream isolation segment 41f to which the first ring segment upstream packing 70a is attached is inserted into the isolation ring groove 22 in the first downstream attaching portion 21f of the blade ring portion 20.

Next, the first downstream pressing member 50f is inserted into the isolation ring groove 22 of the first downstream attaching portion 21f, and the first downstream pressing member 50f is fixed to the first downstream attaching portion 21f with the first downstream bolt 60f. In this case, the guide projection portion 52f of the first downstream pressing member 50f is put into the guide groove portion 48f of the first downstream isolation segment 41f, and the downstream face 56f of the first downstream pressing member 50f is brought into contact with the upstream face 46f of the attached portion 47 of the first downstream isolation segment 41f in the axial direction Da whereby the first downstream isolation segment 41f is pushed to the downstream side in the axial direction by the first downstream pressing member 50f.

In the process in which the first downstream isolation segment 41f is pushed to the downstream side, the first ring segment upstream packing 70a is compressed in the axial direction Da, and the first downstream isolation segment 41f and the first split segment 31a are sealed therebetween. Moreover, the first split segment 31a is pushed to the downstream side by the first downstream isolation segment 41f the first ring segment downstream packing 70b is compressed in the axial direction Da, and the first split segment 31a and the second upstream isolation segment 41g are sealed therebetween. Additionally, positioning of the first split segment 31a in the radial direction Dr and the axial direction Da is also completed by screwing of the first downstream bolt 60f.

Finally, the downstream projection 17 of the first vane 11a is inserted into the first vane attachment groove 42f of the first downstream isolation ring 40f, and the fixing block 49 (FIG. 11) is fixed to the first upstream attaching portion 21j of the blade ring portion 20.

As described above, also in the present embodiment, similarly to the first embodiment, the first blade ring portion 20f to which the first vanes 11a are attached, and the second blade ring portion 20g to which the second vanes 11b are attached form the integrally formed blade ring portion 20 (integrated blade ring 20y). Thus, high accurate clearance control of the overall integrated blade ring is possible, and the performance of the turbine is further improved.

Additionally, also in the present embodiment, similarly to the first embodiment, in the process of assembling the first ring segment 30a and the second vane 11b arranged in the vicinity of the center of the blade ring portion 20 in the axial direction Da, the first ring segment 30a and second vane 11b can be fixed to the blade ring portion 20 while being compressed in the axial direction Da.

Additionally, in the present embodiment, a plurality of parts to be attached to the blade ring portion 20 can be moved, in the axial direction Da and installed. Thus, the parts can be installed to the blade ring portion 20 more easily than in the first embodiment.

Additionally, in the present embodiment, packings can be inserted into the packing grooves from the axial direction as compared to the first embodiment. Thus, damage to packing surfaces during attachment of the packings can be prevented.

Additionally, in all of the blade ring portions 20 of the above respective embodiments, the vanes 11 equivalent to two stages are attached. However, the vanes 11 of a greater number of stages may be attached. Additionally, in the blade ring portion 20 here, a plurality of vane stages 10 including the first vane stage 10a furthest away on the upstream side are attached. However, a plurality of vane stages further on the downstream side than the first vane stage 10a may be attached to the blade ring portion.

INDUSTRIAL APPLICABILITY

The present invention relates to a gas turbine equipped with a rotor and a casing which covers this rotor, and particularly, to the structure of the casing of the gas turbine. According to the invention, the assemblability of the casing which integrates a plurality of blade ring portions can be secured.

REFERENCE SIGNS LIST

3: TURBINE
4: CASING
5: ROTOR
6: ROTOR BODY
7: ROTOR DISC
8: BLADE STAGE
9: BLADE
10: VANE STAGE
10a: FIRST VANE STAGE
10b: SECOND VANE STAGE
11: VANE
11a: FIRST VANE
11b: SECOND VANE
20: BLADE RING PORTION
20a, 20f: FIRST BLADE RING PORTION
20b, 20g: SECOND BLADE RING PORTION
20x, 20y: INTEGRATED BLADE RING
21a, 21f: FIRST DOWNSTREAM ATTACHING PORTION 21b, 21g: SECOND UPSTREAM ATTACHING PORTION
21c, 21h: SECOND DOWNSTREAM ATTACHING PORTION
21d, 21i: THIRD ATTACHING PORTION
22: ISOLATION RING GROOVE
23s: THROUGH GROOVE
23: UPSTREAM WALL
25: DOWNSTREAM WALL
25f, 25g: UPSTREAM FACE
30: RING SEGMENT
30a: FIRST RING SEGMENT
30b: SECOND RING SEGMENT
31: SPLIT SEGMENT
31a: FIRST SPLIT SEGMENT
31b: SECOND SPLIT SEGMENT
40: ISOLATION RING
40a, 40f: FIRST DOWNSTREAM ISOLATION RING
40b, 40g: SECOND UPSTREAM ISOLATION RING
40c, 40b: SECOND DOWNSTREAM ISOLATION RING
40d, 40i: THIRD ISOLATION RING
41: ISOLATION SEGMENT
41a, 41f: FIRST DOWNSTREAM ISOLATION SEGMENT
41b, 41g: SECOND UPSTREAM ISOLATION SEGMENT
41c, 41h: SECOND DOWNSTREAM ISOLATION SEGMENT
41d, 41i: THIRD ISOLATION SEGMENT
46f, 46g: UPSTREAM FACE
47s: PRESSING MEMBER GROOVE
48f, 48g: GUIDE PROJECTION PORTION
49f, 49g: TOP PROJECTION
50: PRESSING MEMBER
50a, 50f: FIRST DOWNSTREAM PRESSING MEMBER
50b, 50g: SECOND UPSTREAM PRESSING MEMBER
50c: SECOND DOWNSTREAM PRESSING MEMBER
50d: THIRD PRESSING MEMBER
54: FEMALE THREAD (MOVEMENT GUIDE PORTION)
56f, 56g: DOWNSTREAM PACE
60: BOLT (FIXTURE)
60a, 60f: FIRST DOWNSTREAM BOLT
60b, 60g: SECOND UPSTREAM BOLT
60c: SECOND DOWNSTREAM BOLT
60d, 60i: THIRD BOLT
60h: PIN
65: FIRST DOWNSTREAM NUT (MOVEMENT GUIDE PORTION)
70a: FIRST RING SEGMENT UPSTREAM PACKING
70b: FIRST RING SEGMENT DOWNSTREAM PACKING
70c: SECOND RING SEGMENT UPSTREAM PACKING
70d: SECOND RING SEGMENT DOWNSTREAM PACKING
71b: SECOND VANE UPSTREAM PACKING
71c: SECOND VANE DOWNSTREAM PACKING
80: SPACE

The invention claimed is:

1. A gas turbine comprising:
a rotor having a rotor body that rotates around a rotation axis, and a plurality of blade stages that are lined up in an axial direction in which the rotation axis extends and that are fixed to the rotor body;
a plurality of vane stages, each of which is arranged on an upstream side of each of the plurality of blade stages; and
a casing that covers the rotor and to which the plurality of vane stages are attached to an inner peripheral side thereof;
wherein the casing comprises
a plurality of blade ring portions that form an annular shape around the rotation axis and that each cover one blade stage and one vane stage;
a plurality of ring segments that form an annular shape around the rotation axis and that are arranged between the plurality of vane stages on an inner peripheral side of the blade ring portions and on an outer peripheral side of the blade stages; and
a plurality of isolation rings for attaching the ring segments arranged on one of an upstream side and a downstream side of the vane stages;
wherein two or more of the blade ring portions that are adjacent to each other in the axial direction form an integrated blade ring that is integrally formed;
wherein an upstream member among the ring segments and the vane stages, which is arranged on an upstream side of a predetermined isolation ring among the plurality of isolation rings, is provided with the predetermined isolation ring, and a downstream member among the ring segments and the vane stages, which is arranged on a downstream side of the predetermined isolation ring, is provided with the predetermined isolation ring; and
wherein the casing further includes
a pressing member which is arranged on the upstream side of the predetermined isolation ring, which is attached to the blade ring portion, and which pushes a pressed member of at least one of the predetermined isolation ring and the upstream member to a downstream side.

2. The gas turbine according to claim 1,
wherein the casing includes a structure in which the pressing member, the predetermined isolation ring, and a downstream wall of the blade ring portion which extends further toward a radially inward side than an outer peripheral surface of the predetermined isolation ring are arranged in this order from the upstream side toward the downstream side in the axial direction, and includes a structure in which the predetermined isolation ring is sandwiched by the pressing member and the downstream wall from the axial direction.

3. The gas turbine according to claim 2,
wherein the blade ring portion includes an upstream wall that extends further toward the radially inward side than the outer peripheral surface of the predetermined isolation ring adjacent to the upstream side of the predetermined isolation ring, and the upstream wall is provided with a through groove through which the pressing member is capable of penetrating in the axial direction.

4. The gas turbine according to claim 2,
wherein the casing includes an annular space which is formed on an axial upstream side of the isolation ring and on the radially inward on the inner peripheral side of the blade ring, with the outer peripheral surface of the predetermined isolation ring as a top face.

5. The gas turbine according to claim 4,
wherein the predetermined isolation ring is provided with a guide portion along which the pressing member arranged on the upstream side of the predetermined isolation ring is slidable in a radial direction,
wherein an isolation ring groove which is recessed toward the radially outward side and which the predetermined isolation ring enters and the pressing member enters is formed on the inner peripheral side of the blade ring portion, and wherein the pressing member is put into the isolation ring groove from the radially inward side and attached to the blade ring portion.

6. The gas turbine according to claim 5, wherein the pressing member is provided with a guide projection portion which protrudes to the downstream side in the axial direction and engages the guide portion of the predetermined isolation ring, and wherein an attached portion, which is located on the radially outward side in the predetermined isolation ring and enters the isolation ring groove, has the thickness of a radially top which is shorter than a maximum groove width of the isolation ring groove in the axial direction at least by an axial length of the guide projection portion.

7. The gas turbine according to claim 5, wherein an inclined face that is gradually directed to the downstream side as it goes toward the radially outward side is formed in an upstream face of the isolation ring groove.

8. The gas turbine according to claim 1, wherein the predetermined isolation ring has a plurality of isolation segments, and the plurality of isolation segments are lined up in a circumferential direction to form an annular shape, thereby constituting the predetermined isolation ring, and wherein each of the plurality of isolation segments is provided with a circumferential opposite face to the pressing member in the circumferential direction which regulates the relative movement of the pressing member in the circumferential direction.

9. The gas turbine according to claim 1, wherein the upstream member has a plurality of upstream member segments, and the plurality of upstream member segments are lined up in a circumferential direction to form an annular shape, and wherein each of the plurality of upstream member segments is provided with a circumferential facing face that faces the face of the pressing member that is directed to the circumferential direction and that regulates the relative movement of the pressing member in the circumferential direction.

10. The gas turbine according to claim 1, wherein the upstream member has a plurality of upstream member segments, and the plurality of upstream member segments are lined up in a circumferential direction to form an annular shape, wherein a circumferential regulating member is provided to regulate the relative movement of the upstream member segment in the circumferential direction with respect to the predetermined isolation ring, and wherein the predetermined isolation ring and the upstream member segment are respectively provided with recesses which mutually different portions of the circumferential regulating member enter and which regulate the relative movement of the circumferential regulating member in the circumferential direction.

11. The gas turbine according to claim 1, wherein the downstream member has a plurality of downstream member segments, and the plurality of downstream member segments are lined up in a circumferential direction to form an annular shape, wherein a circumferential regulating member is provided to regulate the relative movement of the downstream member segment in the circumferential direction with respect to the integrated blade ring, and wherein the integrated blade ring and the downstream member segment are respectively provided with recesses which mutually different portions of the circumferential regulating member enter and which regulate the relative movement of the circumferential regulating member in the circumferential direction.

12. The gas turbine according to claim 1, wherein the pressing member is attached to the blade ring portion with a bolt which has a bolt head and a shank having one end fixed to the bolt head and a male thread formed at feast at the other end thereof, wherein the pressing member, the blade ring portion, and the predetermined isolation ring are respectively provided with a through hole which passes through each of them in the axial direction and communicate with each other, and which the shank of the bolt enters, and wherein the inner peripheral surface of the through hole of one of the pressing member and the blade ring portion is provided with a female thread into which the male thread of the bolt is screwed.

13. The gas turbine according to claim 1, wherein the pressing member is attached to the blade ring portion with a bolt which has a bolt head and a shank having one end fixed to the bolt head and a male thread formed at least at the other end thereof, and wherein the shank of the bolt engages the pressing member and the blade ring portion.

14. The gas turbine according to claim 1, further comprising at least one packing of a packing between the upstream member and the predetermined isolation ring which is elastically deformed in the axial direction to perform sealing, and a packing between the downstream member and the predetermined isolation ring which is elastically deformed in the axial direction to perform sealing.

15. The gas turbine according to claim 1, wherein a plurality of first vanes which constitute a first vane stage of the plurality of vane stages are attached to the first blade ring portion among the two or more blade ring portions, and a plurality of second vanes which constitute a second vane stage arranged further toward the downstream side than the first vane stage are attached to the second blade ring portion arranged further toward the downstream side than the first blade ring portion, wherein the predetermined isolation ring includes a second upstream isolation ring which attaches a downstream portion of a first ring segment, which is arranged between the first vane stage and the second vane stage, among the plurality of ring segments to the second blade ring portion and which attaches an upstream portion in an outer shroud of the second vane to the second blade ring portion, and wherein the upstream member in the second upstream isolation ring is the first ring segment and the downstream member is the second vane stage.

16. The gas turbine according to claim 15, wherein the predetermined isolation ring includes a second downstream isolation ring which attaches an upstream portion of a second ring segment which is arranged on the downstream side of the second vane stage among the plurality of ring segments to the second blade ring portion, and which attaches a downstream portion in an outer shroud of the second vane to the second blade ring portion, and wherein the upstream member in the second downstream isolation ring is the second vane stage and the downstream member is the second ring segment.

17. The gas turbine according to claim 15,
wherein the predetermined isolation ring includes a first downstream isolation ring which attaches an upstream portion of the first ring segment to the first blade ring portion and which attaches a downstream portion in an outer shroud of the first vane to the first blade ring portion, and
wherein the upstream member in the first downstream isolation ring is the first vane stage and the downstream member is the first ring segment.

* * * * *